(12) United States Patent
Wakita et al.

(10) Patent No.: US 9,873,618 B2
(45) Date of Patent: Jan. 23, 2018

(54) MEASUREMENT SYSTEM INCLUDED IN DESALINATION SYSTEM, DESALINATION SYSTEM, AND DESALINATION METHOD

(71) Applicant: PANASONIC CORPORATION, Osaka (JP)

(72) Inventors: Yumi Wakita, Nara (JP); Norihisa Mino, Osaka (JP); Hiroki Takeuchi, Osaka (JP); Mikiya Nakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 635 days.

(21) Appl. No.: 14/500,061

(22) Filed: Sep. 29, 2014

(65) Prior Publication Data

US 2015/0014145 A1    Jan. 15, 2015

Related U.S. Application Data

(63) Continuation of application No. PCT/JP2013/007558, filed on Dec. 25, 2013.

(30) Foreign Application Priority Data

Dec. 27, 2012 (JP) .................. 2012-284788

(51) Int. Cl.
*C02F 1/04* (2006.01)
*C02F 1/08* (2006.01)
(Continued)

(52) U.S. Cl.
CPC .............. *C02F 1/008* (2013.01); *B01B 1/005* (2013.01); *B01D 1/00* (2013.01); *B01D 3/42* (2013.01);
(Continued)

(58) Field of Classification Search
CPC .. C02F 1/008; C02F 1/042; C02F 1/08; C02F 1/14; B01D 1/0005; B01D 1/0035;
(Continued)

(56) References Cited

U.S. PATENT DOCUMENTS

| 5,270,080 A | 12/1993 | Mino et al. |
| 2008/0302715 A1 | 12/2008 | Venville |

(Continued)

FOREIGN PATENT DOCUMENTS

| CN | 101267874 A | 9/2008 |
| CN | 101739035 A | 6/2010 |

(Continued)

OTHER PUBLICATIONS

English translation of International Search Report issued in PCT/JP2013/007558, dated Feb. 4, 2014.

(Continued)

*Primary Examiner* — Brian McCaig
(74) *Attorney, Agent, or Firm* — McDermott Will & Emery LLP

(57) ABSTRACT

In a desalination system, a water-repellent particle layer is provided at a lower portion of a water tank and composed of water-repellent particles. A devolatilizing layer is provided below the layer. Liquid is provided in the tank and is heated for evaporation, and obtained vapor passes through the particle layer and is liquefied at the devolatilizing layer, so that freshwater is obtained from the liquid. The particle layer includes a first and a second particle layers composed of discriminable first and second particles. A particle measuring unit measures an amount of the second water-repellent particles. A decision unit decides whether or not the measured amount of the second water-repellent particles is equal to or more than a predetermined value. A controller alerts (Continued)

when the decision unit decides that the amount of the second particles is equal to or more than the predetermined value.

16 Claims, 21 Drawing Sheets

(51) Int. Cl.
*B01D 1/00* (2006.01)
*C02F 1/00* (2006.01)
*B01D 3/42* (2006.01)
*B01B 1/00* (2006.01)
*C02F 1/14* (2006.01)
*C02F 103/08* (2006.01)

(52) U.S. Cl.
CPC .................. *C02F 1/04* (2013.01); *C02F 1/08* (2013.01); *C02F 2103/08* (2013.01); *Y02W 10/37* (2015.05)

(58) Field of Classification Search
CPC .... B01D 1/0076; B01D 1/0082; B01D 5/006; Y02W 10/37
See application file for complete search history.

(56) References Cited

U.S. PATENT DOCUMENTS

| 2009/0090663 | A1 | 4/2009 | Hirata et al. |
| 2012/0138448 | A1 | 6/2012 | Mino et al. |

FOREIGN PATENT DOCUMENTS

| JP | 60-013206 U | 1/1985 |
| JP | 07-063670 B | 7/1995 |
| JP | 11-216459 A | 8/1999 |
| JP | 2000-171592 A | 6/2000 |
| WO | 2012/060036 A1 | 5/2012 |

OTHER PUBLICATIONS

English translation of International Search Report issued in PCT/JP2013/007569, dated Feb. 4, 2014.
International Preliminary Report on Patentability dated Jul. 21, 2015 issued in International Patent Application No. PCT/JP2013/007569.
International Preliminary Report on Patentability dated Jun. 30, 2015 issued in International Patent Application No. PCT/JP2013/007558.
Office Action dated Jul. 7, 2016 issued in Chinese Patent Application No. 201380018339.8 (English translation).
U.S. Non-final Office Action dated Apr. 21, 2017 issued in U.S. Appl. No. 14/500,566.

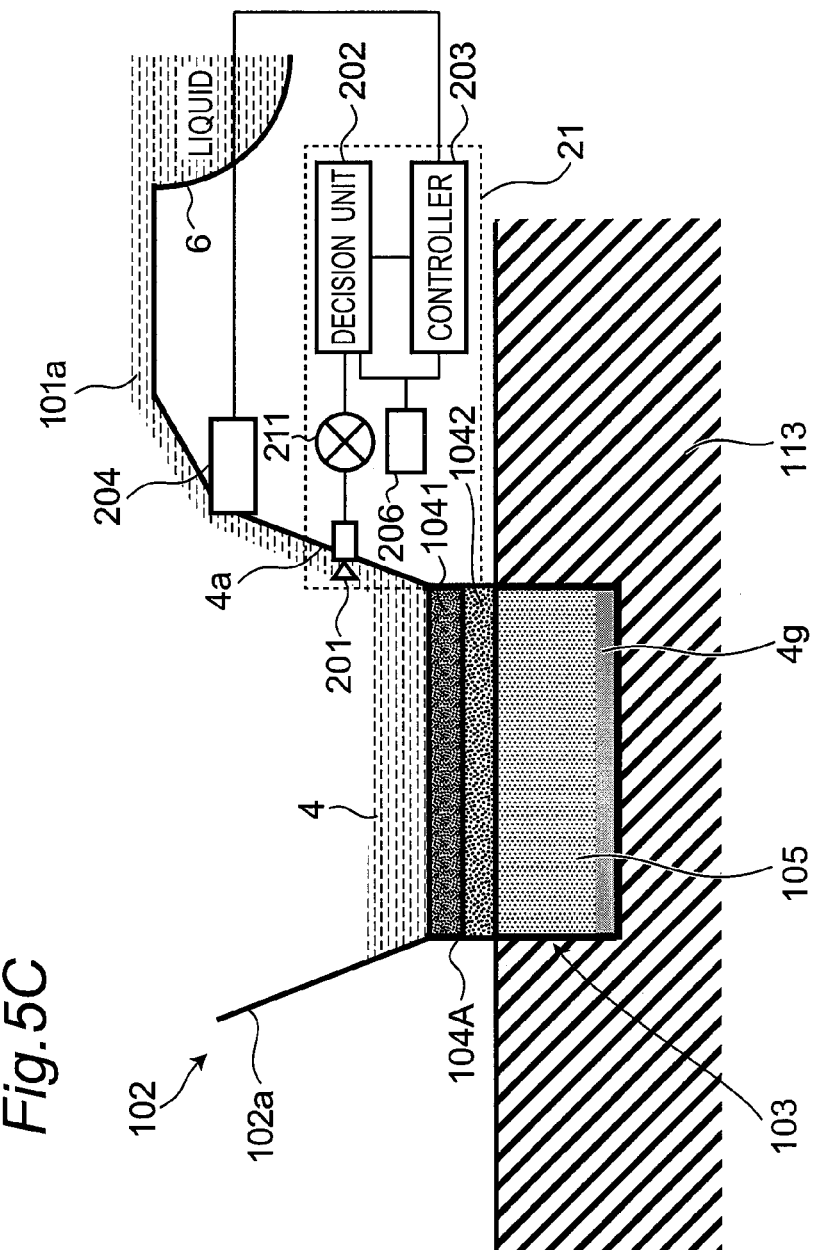

- 1041
- 1042
- 1043

| REFERENCE VALUE | COMMAND |
| --- | --- |
| PREDETERMINED OR MORE AMOUNT OF PARTICLES IN COLOR OF SECOND PARTICLE LAYER | OUTPUT ALERT OR DECREASE AMOUNT OF LIQUID TO BE SUPPLIED |
| PREDETERMINED OR MORE AMOUNT OF PARTICLES IN COLOR OF THIRD PARTICLE LAYER | STOP SUPPLY OF LIQUID |

MEASUREMENT SYSTEM INCLUDED IN DESALINATION SYSTEM, DESALINATION SYSTEM, AND DESALINATION METHOD

CROSS-REFERENCE TO RELATED APPLICATIONS

This is a continuation application of International Application No. PCT/JP2013/007558, with an international filing date of Dec. 25, 2013, which claims priority of Japanese Patent Application No.: 2012-284788 filed on Dec. 27, 2012, the content of which is incorporated herein by reference.

TECHNICAL FIELD

The technical field present disclosure relates to a measurement system included in a desalination system, the desalination system, and a desalination method.

BACKGROUND ART

Patent Literature 1 discloses a desalination system as well as a desalination method, using water-repellent particles.

CITATION LIST

Patent Literature

[Patent Literature 1] WO 2012/060036 A

SUMMARY OF THE INVENTION

However, there is no disclosure of a specific configuration for actual desalination.

One non-limiting and exemplary embodiment provides present disclosure a measurement system included in a desalination system, the desalination system, and a desalination method that enable efficient desalination.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A measurement system included in a desalination system comprising:
a water tank;
a water-repellent particle layer provided at a lower portion of the water tank and composed of water-repellent particles; and
a devolatilizing layer provided below the water-repellent particle layer,
wherein liquid is introduced to the water tank,
the introduced liquid is heated to be evaporated into water vapor, and
the water vapor passes through the water-repellent particle layer and is liquefied at the devolatilizing layer, and fresh water is obtained from the liquid,
the water-repellent particle layer comprises a first particle layer composed of first water-repellent particles and a second particle layer provided below the first particle layer and composed of second water-repellent particles that are discriminable from the first water-repellent particles,
the measurement system comprising:
a particle measuring unit that measures an amount of the second water-repellent particles contained in the liquid;
a decision unit that decides whether or not the amount of the second water-repellent particles measured by the particle measuring unit is equal to or more than a predetermined value; and
a controller that outputs, when the decision unit decides that the amount of the second water-repellent particles is equal to or more than the predetermined value, an alert signal, a signal to stop introduction of liquid to the water tank, or a signal to decrease speed of introducing liquid to the water tank in comparison to speed of introducing liquid to the water tank prior to decision by the decision unit.

These general and specific aspects may be implemented using a system, a method, and a computer program, and any combination of systems, methods, and computer programs.

According to the aspect of the present disclosure, the water-repellent particle layer at least includes the two layers of the first particle layer and the second particle layer to hold liquid. The particle measuring unit measures the amount of the second water-repellent particles floating from the second particle layer into the liquid. It is thus possible to accurately detect a state where the first particle layer is eroded partially and the second particle layer starts being eroded, and previously prevent breakage of the water-repellent particle layer. It is thus possible to efficiently and reliably perform automatic desalination processing.

BRIEF DESCRIPTION OF THE DRAWINGS

These and other aspects and features of the present disclosure will become clear from the following description taken in conjunction with the embodiments thereof with reference to the accompanying drawings, in which:

FIG. 5C is a partially sectional explanatory view of the desalination system according to the first embodiment including a repair unit;

DETAILED DESCRIPTION

Figure 1:
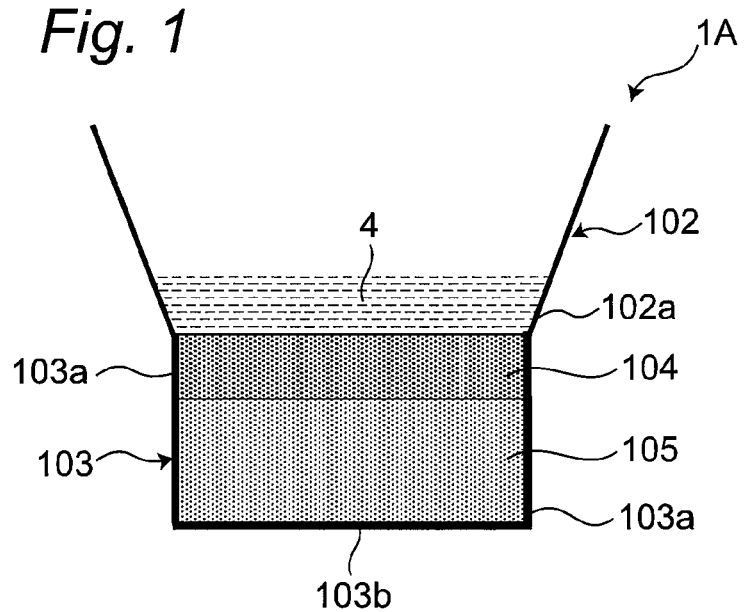
FIG. 1 is a sectional view showing a basic configuration of a desalination apparatus according to a first embodiment.

Before the description of the various embodiments proceeds, various approaches made by the inventors to accomplish the embodiments are explained.

Examples of the disclosed technique are as follows.

1st aspect: A measurement system included in a desalination system comprising:

a water tank;

a water-repellent particle layer provided at a lower portion of the water tank and composed of water-repellent particles; and a devolatilizing layer provided below the water-repellent particle layer, wherein liquid is introduced to the water tank, the introduced liquid is heated to be evaporated into water vapor, and the water vapor passes through the water-repellent particle layer and is liquefied at the devolatilizing layer, and fresh water is obtained from the liquid, the water-repellent particle layer comprises a first particle layer composed of first water-repellent particles and a second particle layer provided below the first particle layer and composed of second water-repellent particles that are discriminable from the first water-repellent particles, the measurement system comprising:

a particle measuring unit that measures an amount of the second water-repellent particles contained in the liquid;

a decision unit that decides whether or not the amount of the second water-repellent particles measured by the particle measuring unit is equal to or more than a predetermined value; and a controller that outputs, when the decision unit decides that the amount of the second water-repellent particles is equal to or more than the predetermined value, an alert signal, a signal to stop introduction of liquid to the water tank, or a signal to decrease speed of introducing liquid to the water tank in comparison to speed of introducing liquid to the water tank prior to decision by the decision unit.

According to the above aspect, the water-repellent particle layer at least includes the two layers of the first particle layer and the second particle layer to hold liquid. The particle measuring unit measures the amount of the second water-repellent particles floating from the second particle layer into the liquid. It is thus possible to accurately detect a state where the first particle layer is eroded partially and the second particle layer starts being eroded, and previously prevent breakage of the water-repellent particle layer. It is thus possible to efficiently and reliably perform automatic desalination processing.

2nd aspect: The measurement system according to the 1st aspect, wherein the first water-repellent particles of the first particle layer and the second water-repellent particles of the second particle layer are different in color.

According to this aspect, it is possible to discriminate between the first water-repellent particles and the second water-repellent particles by color and predict breakage of the water-repellent particle layer due to erosion of the water-repellent particle layer.

3rd aspect: The measurement system according to the 1st or 2nd aspect, wherein the particle measuring unit is a camera configured to image a top surface of the liquid layer and an inside near the top surface to measure the amount of the second water-repellent particles contained in the liquid layer.

According to this aspect, the camera is capable of not capturing the surface of the water-repellent particle layer in a color same as that of the floating second water-repellent particles. It is thus possible to accurately measure the amount of the second water-repellent particles contained in the liquid layer.

4th aspect: The measurement system according to the 1st or 2nd aspect, wherein the particle measuring unit is a camera that is provided on a side wall of the water tank and is configured to image an inside of the liquid layer, and the camera is configured to image a side wall opposite to the side wall provided with the camera through the inside of the liquid layer to measure the amount of the second water-repellent particles contained in the liquid layer.

According to this aspect, the camera is capable of not capturing the surface of the water-repellent particle layer in a color same as that of the floating second water-repellent particles. It is thus possible to accurately measure the amount of the second water-repellent particles contained in the liquid layer.

5th aspect: The measurement system according to any one of the 1st to 4th aspects, wherein the particle measuring unit is configured to transmit, to the decision unit, the amount of the second water-repellent particles associated with measurement time.

6th aspect: The measurement system according to any one of the 1st to 5th aspects, wherein the water-repellent particle layer further comprises a third particle layer provided below the second particle layer and having third water-repellent particles that are discriminable from the first water-repellent particles and the second water-repellent particles, the particle measuring unit is configured to measure the amount of the second water-repellent particles and an amount of the third water-repellent particles contained in the liquid layer, the decision unit is configured to decide whether or not the measured amount of the second water-repellent particles is equal to or more than a predetermined value, and decide whether or not the measured amount of the third water-repellent particles is equal to or more than a predetermined value, and the controller is configured to output, when the decision unit decides that the amount of the second water-repellent particles is equal to or more than the predetermined value, the alert signal or the signal to decrease the speed of introducing liquid to the water tank in comparison to the speed of introducing liquid to the water tank prior to the decision by the decision unit, and stop, when the decision unit decides that the amount of the third water-repellent particles is equal to or more than the predetermined value, introduction of liquid to the water tank.

According to this aspect, the water-repellent particle layer includes the three or more particle layers each having discriminable water-repellent particles. It is thus possible to accurately implement two-step management including issuing an alert, decreasing the amount of the introduced liquid, or the like upon appearance of the color of the water-repellent particles of the second particle layer, and immediately stopping introduction of liquid or the like upon appearance of the color of the water-repellent particles of the third particle layer. It is thus possible to more accurately and effectively prevent breakage of the water-repellent particle layer and more efficiently perform automatic desalination processing.

7th aspect: The measurement system according to any one of the 1st to 5th aspects, wherein the decision unit is configured to obtain, when deciding that the measured amount of the second water-repellent particles is equal to or more than a predetermined first reference value, a variation amount of the water-repellent particles between first measurement information as information on the measured amount of the second water-repellent particles and preliminarily held measurement information, further decide, when the obtained variation amount of the water-repellent particles is more than a second reference value, whether or not a variation amount between the first measurement information and second measurement information as information on an amount of the second water-repellent particles measured after the first measurement information is less than a third reference value, and cause the particle measuring unit to measure again when deciding that the variation amount is equal to or more than the third reference value, and the controller is configured to output, when the decision unit decides that the variation amount is less than the third reference value, the alert signal, the signal to stop introduction of the liquid to the water tank, or the signal to decrease the speed of introducing liquid to the water tank in comparison to the speed of introducing the liquid to the water tank prior to the decision by the decision unit.

According to this aspect, even when the flow of the liquid temporarily floats a large amount of water-repellent particles and the decision unit decides that the measured amount of the second water-repellent particles is equal to or more than the first reference value, it is possible to recognize that the amount of the second water-repellent particles is temporarily equal to or more than the first reference value by comparing the measurement information acquired before the measurement of the amount of the second water-repellent particles and the subsequent measurement information acquired after the measurement of the amount of the second water-repellent particles. It is thus possible to prevent erroneous estimation that a larger amount of water-repellent particles are floating than the actually floating water-repellent particles and output of an erroneous alert or the like, and perform more efficient desalination processing.

8th aspect: The measurement system according to any one of the 1st to 7th aspects, wherein the decision unit is configured to, when wind force measured by an anemometer that is provided to the water tank and is configured to measure wind force is equal to or more than a wind force deciding predetermined value, obtain, when deciding that the measured amount of the second water-repellent particles is equal to or more than a predetermined first reference value, a variation amount of the second water-repellent particles between first measurement information as information on the measured amount of the second water-repellent particles and preliminarily held measurement information, further decide, when the obtained variation amount of the second water-repellent particles is more than a second reference value, whether or not a variation amount between the first measurement information and second measurement information as information on an amount of the second water-repellent particles measured after the first measurement information is less than a third reference value, and cause the particle measuring unit to measure again when deciding that the variation amount is equal to or more than the third reference value, and the controller is configured to output, when the decision unit decides that the variation amount is less than the third reference value, the alert signal, the signal to stop introduction of the liquid to the water tank, or the signal to decrease the speed of introducing the liquid to the water tank in comparison to the speed of introducing the liquid to the water tank prior to the decision by the decision unit, the decision unit is configured to, when the wind force measured by the anemometer is less than the wind force deciding predetermined value, decide whether or not the amount of the second water-repellent particles measured by the particle measuring unit is equal to or more than a liquid amount control deciding predetermined value, and the controller is configured to output, when the decision unit decides that the amount of the second water-repellent particles is equal to or more than the liquid amount control deciding predetermined value, the alert signal, the signal to stop introduction of liquid to the water tank, or the signal to decrease the speed of introducing liquid to the water tank in comparison to the speed of introducing liquid to the water tank prior to the decision by the decision unit.

According to this aspect, even when the flow of the liquid temporarily floats a large amount of water-repellent particles and the decision unit decides that the measured amount of the second water-repellent particles is equal to or more than the first reference value, it is possible to recognize that the amount of the second water-repellent particles is temporarily equal to or more than the first reference value by comparing the measurement information acquired before the measurement of the amount of the second water-repellent particles and the subsequent measurement information acquired after the measurement of the amount of the second water-repellent particles. It is thus possible to prevent erroneous estimation that a larger amount of water-repellent particles are floating than the actually floating water-repellent particles and output of an erroneous alert or the like, and perform more efficient desalination processing.

9th aspect: A desalination system comprising:
a water tank that receives introduced liquid;
a first particle layer provided at a lower portion of the water tank and having first water-repellent particles;
a second particle layer provided below the first particle layer and having second water-repellent particles that are discriminable from the first water-repellent particles;
a devolatilizing layer provided below the second particle layer;
a particle measuring unit that measures an amount of the second water-repellent particles in the liquid;
a decision unit that decides whether or not the amount of the second water-repellent particles measured by the particle measuring unit is equal to or more than a predetermined value; and
a controller that outputs, when the decision unit decides that the amount of the second water-repellent particles is equal to or more than the predetermined value, an alert signal, a signal to stop introduction of liquid to the water tank, or a signal to decrease speed of introducing liquid to the water tank in comparison to speed of introducing liquid to the water tank prior to the decision by the decision unit.

According to the above aspect, the water-repellent particle layer at least includes the two layers of the first particle layer and the second particle layer to hold liquid. The particle measuring unit measures the amount of the second water-repellent particles floating from the second particle layer into the liquid. It is thus possible to accurately detect a state where the first particle layer is eroded partially and the second particle layer starts being eroded, and previously prevent breakage of the water-repellent particle layer. It is thus possible to efficiently and reliably perform automatic desalination processing.

10th aspect: A desalination method for obtaining fresh water from liquid using a desalination apparatus comprising:
a water tank for containing liquid;
a first particle layer provided at a lower portion of the water tank and composed of first water-repellent particles;
a second particle layer provided below the first particle layer and composed of second water-repellent particles that are discriminable from the first water-repellent particles; and
a devolatilizing layer provided below the second particle layer;
the desalination method comprising:
measuring, by a particle measuring unit, an amount of the second water-repellent particles in the liquid;
deciding, by a decision unit, whether or not the measured amount of the second water-repellent particles is equal to or more than a predetermined value; and
outputting by a controller, when the decision unit decides that the amount of the second water-repellent particles is equal to or more than the predetermined value, an alert signal, a signal to stop introduction of liquid to the water tank, or a signal to decrease speed of introducing liquid to the water tank in comparison to speed of introducing liquid to the water tank prior to the decision by decision unit.

According to the above aspect, the water-repellent particle layer at least includes the two layers of the first particle layer and the second particle layer to hold liquid. The particle measuring unit measures the amount of the second water-repellent particles floating from the second particle layer into the liquid. It is thus possible to accurately detect a state where the first particle layer is eroded partially and the second particle layer starts being eroded, and previously prevent breakage of the water-repellent particle layer. It is thus possible to efficiently and reliably perform automatic desalination processing.

11th aspect: The desalination method according to the 10th aspect, further comprising:
introducing liquid to the water tank and locating the liquid on the water-repellent particle layer;
heating the located liquid to evaporate the liquid into water vapor; and
obtaining fresh water from the liquid by causing the water vapor to pass through the first particle layer and the second particle layer, then reach the devolatilizing layer and be liquefied.

A first embodiment of the present disclosure is described in detail below with reference to the drawings.

Definition of Terms

The term "water repellency" means the property of repelling water in this description.

First Embodiment

In order to describe a desalination apparatus 1 according to the first embodiment with reference to the drawings, initially described is a desalination apparatus 1A that basically functions similarly to the desalination apparatus 1. FIG. 1 is a sectional view of the desalination apparatus 1A according to the first embodiment.

The desalination apparatus 1A shown in FIG. 1 includes a water tank 102, a water-repellent particle layer 104, and a devolatilizing layer 105. The water tank 102, the water-repellent particle layer 104, and the devolatilizing layer 105 are disposed in the mentioned order from the top to the bottom.

<Water Tank 102>

The water tank 102 can have any shape in a planar view, such as a rectangular shape or a circular shape. The water tank 102 has an upper side wall 102a that surrounds the entire side surface of the water tank 102.

There can be provided a container 103 so as to surround the side surface of the water tank 102, the side surface of the water-repellent particle layer 104 to be described later, and the side surface and the bottom surface of the devolatilizing layer 105 to be described later.

The container 103 shown in FIG. 1 has a lower side wall 103 provided vertically, the upper side wall 102a that is connected to the lower side wall 103 and is slanted so as to expand upward, and a bottom plate 103b that is connected to the lower side wall 103.

The container 103 is formed such that surfaces other than the top surface thereof are surrounded with the upper side wall 102a, the lower side wall 103, and the bottom plate 103b. At a lower portion of the water tank 102, the lower side wall 103a surrounds the entire side portions of the water-repellent particle layer 104 and the devolatilizing layer 105 to be described later and the bottom plate 103b holds the bottom surface of the devolatilizing layer 105. The container 103 is capable of reserving desalinated fresh water 4g in the devolatilizing layer 105.

The lower side wall 103a and the upper side wall 102a are each made of a water-repellent material. Examples of the lower side wall 103a and the upper side wall 102a include metal plate concrete, a waterproof sheet, and clay.

Liquid poured into the water tank 102 forms a liquid layer 4 on the water-repellent particle layer 104 and in (in the space surrounded with the upper side wall 102a) the water tank 102.

The water tank 102 can optionally have an introduction path 101a that is used for introducing liquid into the water tank 102. If the water tank 102 has no introduction path 101a, liquid is introduced to the water tank 102 from an opening provided at the top of the water tank 102. Such liquid is transparent, translucent, or the like so that particle measurement is enabled as to be described later.

The water-repellent particle layer 104 and the upper side wall 102a have water repellency, so that liquid poured into the water tank 102 does not flow into the devolatilizing layer 105. Liquid poured into the water tank 102 is provided and kept as the liquid layer 4 on the water-repellent particle layer 104 that is surrounded with the upper side wall 102a. The liquid layer 4 is 15 to 50 cm in level, for example. If the liquid layer 4 is too high (e.g. higher than 50 cm), it takes more time to heat liquid, large heat capacity is necessary, and liquid desalination efficiency thus deteriorates, as to be described later. In contrast, if the liquid layer 4 is too low (e.g. lower than 15 cm), liquid desalination efficiency is too low. It is possible to keep preferred desalination efficiency within the above numerical range.

Figure 5A:
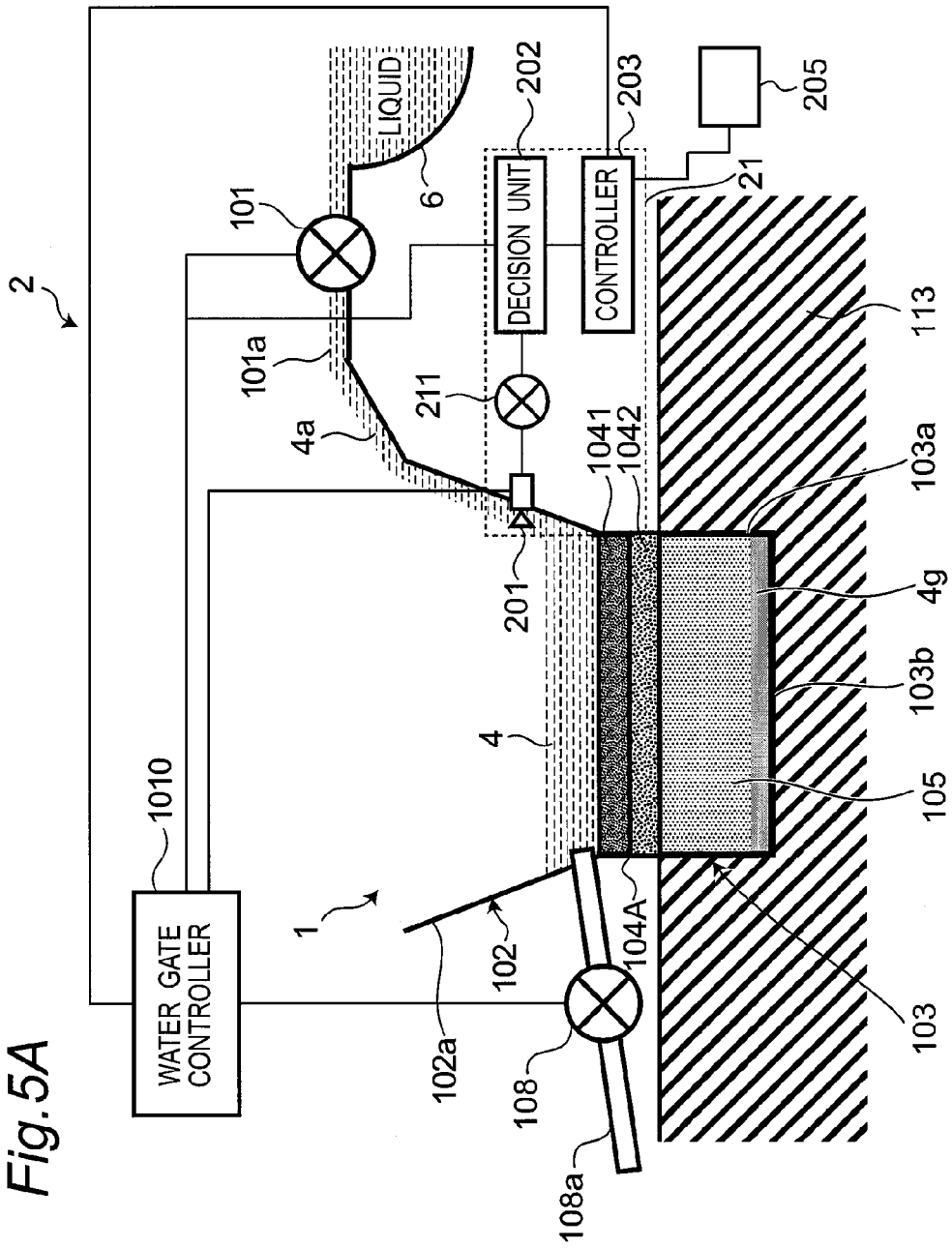
FIG. 5A is a partially sectional explanatory view of a desalination system according to the first embodiment.

The introduction path 101a can optionally have a water gate 101 for adjusting liquid introduced to the water tank 102 through the introduction path 101a (see FIG. 5A). The water gate 101 adjusts a flow rate of liquid that is provided between the water tank 102 and an external tank 6 reserving the liquid. Examples of the external tank 6 include the sea, a preprocessing tank reserving seawater introduced from the sea, and a tank reserving salt water that is supplied separately.

When the water gate 101 is opened, the liquid is introduced from the external tank 6 to the water tank 102 through the introduction path 101a. Closing the water gate 101 stops introduction of the liquid from the external tank 6 to the water tank 102 through the introduction path 101a. A water gate controller 1010 controls opening/closing of the water gate 101.

The water gate controller 1010 can optionally control opening/closing of the water gate 101 in accordance with information inputted by a user or the like using an input unit 1011. Examples of the input unit 1011 include a touch panel, a keyboard, a cursor, and a microphone. Information inputted by a user or the like using the input unit 1011 relates to opening or closing of the water gate 101.

The water tank 102 can optionally have a heater for heating the liquid layer 4 in the water tank 102. For example, the heater is located on the upper side wall 102a of the water tank 102.

<Water-Repellent Particle Layer 104>

The water-repellent particle layer 104 is located at the lower portion of the water tank 102. The water-repellent particle layer 104 is composed of at least a plurality of water-repellent particles, normally a large number of water-repellent particles. Such a large number of water-repellent particles are closely located to form the water-repellent particle layer 104. More specifically, the surface of a single water-repellent particle is in contact with surfaces of a plurality of other water-repellent particles. The water-repellent particles in contact with each other in the water-repellent particle layer 104 form gaps therebetween which allow water vapor formed by heating and evaporating liquid to pass through.

The water-repellent particle layer 104 composed of the water-repellent particles is capable of decreasing entrance of liquid into the water-repellent particle layer 104. The entire side surface of the water-repellent particle layer 104 can be surrounded with the lower side wall 103a. When the water-repellent particle layer 104 is surrounded with the lower side wall 103a, liquid can be prevented from entering the water-repellent particle layer 104.

Each water-repellent particle includes a particle and a water-repellent film coating the surface of the particle.

Examples of such a particle include gravel, sand, silt, and clay. The gravel is a particle having a diameter larger than 2 mm and equal to or less than 75 mm. The sand is a particle having a diameter larger than 0.075 mm and equal to or less than 2 mm. The silt is a particle having a diameter larger than 0.005 mm and equal to or less than 0.075 mm. The clay is a particle having a diameter of 0.005 mm or less.

A water-repellent film coats the surface of each particle. The water-repellent film preferably includes a fluorocarbon group expressed by the chemical formula $-(CF_2)n-$. In this formula, n denotes a natural number. The preferred range of n is 2 or more as well as 20 or less.

The water-repellent film is preferably bonded with the particle by means of covalent bonding. The following chemical formula (I) expresses a preferred water-repellent film.

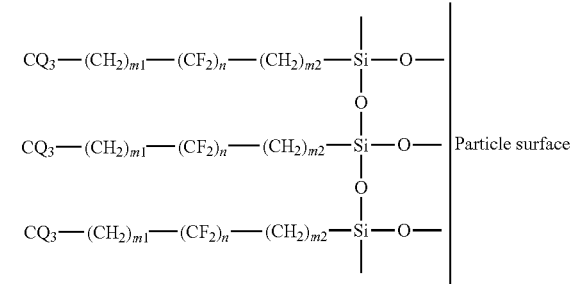

(I)

In this formula, Q denotes hydrogen or fluorine.

m1 and m2 each independently denote 0 or a natural number of 1 or more.

In this formula, n is 2 or more as well as 20 or less.

Described below is an exemplary method of producing water repellent particles.

Next, a surface active agent expressed by the chemical formula $CX_3-(CH_2)m1-(CF_2)n-(CH_2)m2-SiX_3$ is initially dissolved in a nonaqueous solvent to prepare a surface active agent solution. In this formula, X denotes halogen, preferably chlorine.

A plurality of particles are immersed in the surface active agent solution in a dry atmosphere to obtain a plurality of water-repellent particles.

For details thereof, reference can be made to U.S. Pat. No. 5,270,080 (corresponding to JP 07-063670 B).

Examples of the material for the water-repellent film include a chlorosilane material or an alkoxysilane material. Examples of the chlorosilane material include heptadecafluoro-1,1,2,2-tetrahydrodecyltrichlorosilane or n-octadecyldimethylchlorosilane. Examples of the alkoxysilane material include n-octadecyltrimethoxysilane or nonafluorohexyltriethoxysilane.

The water-repellent particle layer 104 is 1 cm or more as well as 30 cm or less in thickness, for example. If the water-repellent particle layer 104 is too thin (less than 1 cm thick), water poured into the water tank 102 can possibly flow into the devolatilizing layer 5. In contrast, if the water-repellent particle layer 104 is too thick (more than 30 cm thick), water vapor to be described later has difficulty to pass through the gaps in the water-repellent particle layer 104.

<Devolatilizing Layer 105>

The devolatilizing layer 105 is located below the water-repellent particle layer 104. The devolatilizing layer 105 can be made of a plurality of particles to which water repellent treatment is not applied. The devolatilizing layer 105 can be alternatively provided as a space surrounded with the lower side wall 103a and the bottom plate 103b.

The entire side portion of the devolatilizing layer 105 can be surrounded with the lower side wall 103a and the bottom portion of the devolatilizing layer 105 can be covered with the bottom plate 103b, so that the container 103 is capable of reserving the fresh water 4g.

Water vapor passing from the water-repellent particle layer 104 through the gaps in the water-repellent particle layer 104 and reaching the devolatilizing layer 105 is liquefied into liquid water (fresh water 4g) in the devolatilizing layer 105. Details thereof will be described later.

The devolatilizing layer 105 is cooled as necessary.

The devolatilizing layer 105 is cooled in the following manner, for example. The devolatilizing layer 105 is at least partially located in soil 113 so as to be cooled. For example, the interface between the devolatilizing layer 105 and the water-repellent particle layer 104 is made flush with the level of the ground surface, so that the devolatilizing layer 105 is made lower in temperature than the water-repellent particle layer 104.

The devolatilizing layer 105 can alternatively have a cooling unit.

Described below is desalination processing using the desalination apparatus 1A thus configured.

<Desalination Processing>

Figure 2:
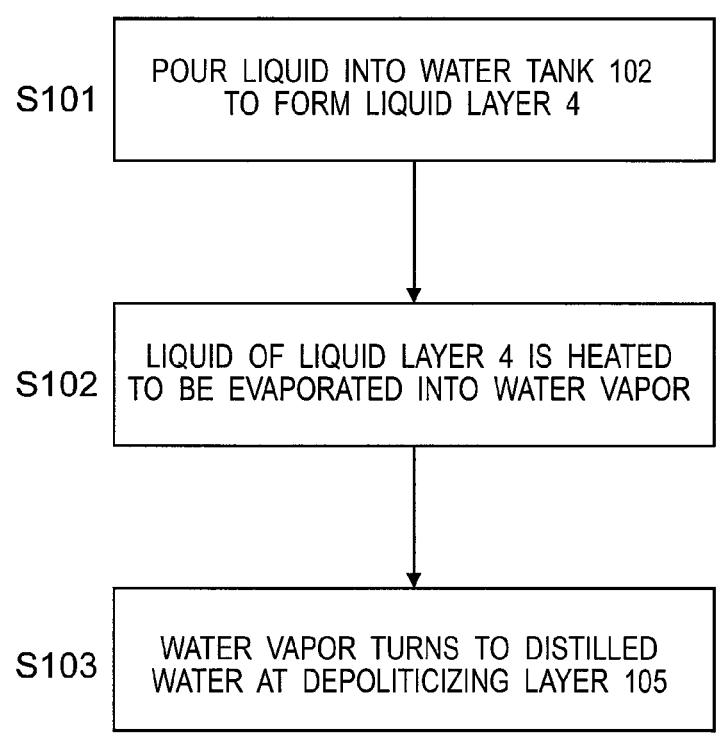
FIG. 2 is a flowchart of desalination processing steps by the desalination apparatus according to the first embodiment.

FIG. 2 illustrates the steps of desalination processing by the desalination apparatus 1A.

<Step S101>

Liquid is poured from the external tank 6 through the water gate 101 and the introduction path 101a into the water tank 102, and forms the liquid layer 4 on the water-repellent particle layer 104 provided in the water tank 102. An example of the liquid is salt water.

<Step S102>

Next, the liquid of the liquid layer 4 in the water tank 102 is heated. When the liquid is heated to reach or exceed a fixed temperature, the liquid is evaporated. For example, the fixed temperature is set depending on the type of liquid and air pressure in accordance with the saturated water vapor pressure curve. When the liquid is salt water, the exemplary fixed temperature is 50 C.° or more as well as 60 C.° or less.

The liquid of the liquid layer 105 is heated by solar light, for example. Alternatively, the liquid of the liquid layer 4 is heated by a heater provided to the water tank 102. Still alternatively, a heated object can be supplied to the liquid layer 4 so that the liquid is heated.

<Step S103>

Next, the water vapor generated by heating the liquid shifts upward as well as downward. The water vapor shifting downward passes through the gaps among the water-repellent particles in the water-repellent particle layer 104 and reaches the devolatilizing layer 105. The water vapor passing through the gaps among the water-repellent particles in the water-repellent particle layer 104 is liquefied into liquid water in the devolatilizing layer 105. For example, the water vapor is cooled and liquefied into liquid water in the devolatilizing layer 105.

In this manner, the desalination apparatus 1A generates water that includes less solid matters contained and fewer impurities dissolved in the liquid poured into the water tank 102.

Examples of the impurities include ions. Examples of the liquid water obtained at the devolatilizing layer 105 include fresh water. The water obtained at the devolatilizing layer 105 is also called "distilled water".

Modification Example

Figure 3:
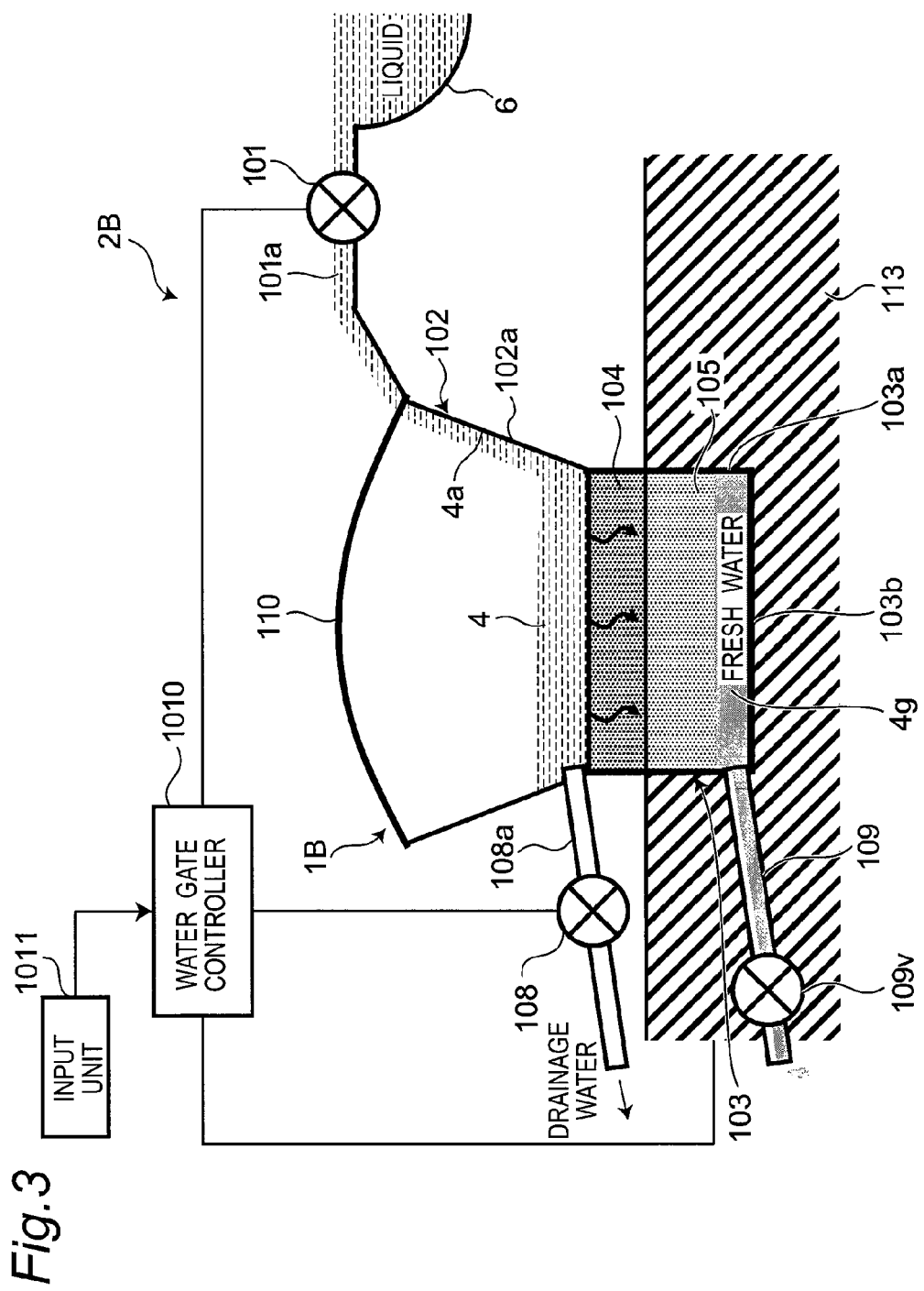
FIG. 3 is a view of a desalination system including a desalination apparatus according to a modification example.

FIG. 3 shows a desalination system 2B including a desalination apparatus 1B according to a modification example of the desalination apparatus 1A.

The water tank 102 can optionally have a drain pipe 108a and a drain valve 108 used for draining liquid of the liquid layer 4 to the outside. When the drain valve 108 is opened, the liquid of the liquid layer 4 is drained from the water tank 102. Closing the drain valve 108 stops draining the liquid of the liquid layer 4 from the water tank 102. The water gate controller 1010 controls opening/closing of the drain valve 108.

There can be optionally provided a film or another structure between the water tank 102 and the water-repellent particle layer 104 so as to allow liquid or water vapor to pass therethrough. Furthermore, there can be optionally provided a film or another structure between the water-repellent particle layer 104 and the devolatilizing layer 105 so as to allow water vapor to pass therethrough.

The water tank 102 can optionally have a distilled water drain pipe 109 and a distilled water drain valve 109v used for draining distilled water in the devolatilizing layer 105 to the outside. When the distilled water drain valve 109v is opened, distilled water in the devolatilizing layer 105 is drained through the distilled water drain pipe 109 to the outside. In contrast, closing the distilled water drain valve 109v stops draining distilled water in the devolatilizing layer 105. The water gate controller 1010 can optionally control opening/closing of the distilled water drain valve 109v.

As shown in FIG. 3, the water tank 102 can optionally have a lid 110 covering an opening in the upper side wall 102a. The lid 110 is capable of decreasing water vapor that is released outward from the water tank 102. The lid 110 is also capable of decreasing impurities that enter from the opening of the water tank 102. When the seawater layer 4 is heated by solar light, the lid 7 is preferably transparent.

The above example refers to the case of obtaining fresh water from salt water. In another case of obtaining distilled water from drainage water or the like containing not salt water but chemical substances dissolved therein, it is also possible to decrease the chemical substances dissolved in the liquid. The desalination apparatuses 1A and 1B are each capable of exerting similar effects as a distillation apparatus. In other words, each of the desalination apparatuses 1A and 1B removes impurities dissolved in liquid.

The desalination apparatuses 1A and 1B are configured as described above. Described next is finding as the basis of the present disclosure, prior to disclosure of the detailed configuration of a desalination system 2 according to the first embodiment of the present disclosure.

(Finding as Basis of the Present Invention)

The present inventors have reached the finding that, in the water-repellent particle layer 104 composed of a plurality of water-repellent particles, the water-repellent particles are shifted easily by force applied thereto and the layer is deformed easily in comparison to a particle layer composed of a plurality of hydrophilic particles.

In the water-repellent particle layer 104 composed of a plurality of water-repellent particles, the adjacent particles are adhered weakly in comparison to the particle layer composed of a plurality of hydrophilic particles. A hydrophilic particle is normally adhered to an adjacent hydrophilic particle with a water molecule being interposed therebetween. In contrast, a water-repellent particle is simply in contact with an adjacent water-repellent particle, so that the water-repellent particles are easily shifted by force applied thereto. When force is applied to a part of the water-repellent particle layer 104, a water-repellent particle receiving the force is shifted while another water-repellent particle receiving no force is not shifted. The water-repellent particle layer 104 is thus likely to be deformed.

An amount of liquid that the water-repellent particle layer 104 is capable of holding on its top surface is decided by a water pressure resistance that is varied by a difference in level between the surface of the liquid and the surface (top surface) of the water-repellent particle layer 104. When liquid exceeding a predetermined water pressure resistance of the water-repellent particle layer 104 is located (provided) on the water-repellent particle layer 104, the liquid passes through the water-repellent particle layer 104. In other words, in such a case the water-repellent particle layer 104 cannot hold the liquid and allows the liquid to pass therethrough. This phenomenon is also called "breakage".

When the liquid layer 4 is formed on the water-repellent particle layer 104, the surface of the water-repellent particle layer 104 is deformed and the difference in level between the water surface and the surface of the water-repellent particle layer 104 is changed. It is thus quite important to specify such deformation of the water-repellent particle layer 104.

The present inventors have reached the finding that, particularly when introducing liquid to the water tank 102, the water-repellent particles possibly shift easily so that the surface (top surface) of the water-repellent particle layer 104 is eroded partially. FIGS. 4A to 4I are enlarged views each exemplifying a state where the water-repellent particle layer 104 is eroded partially.

<FIG. 4A>

Figure 4A:
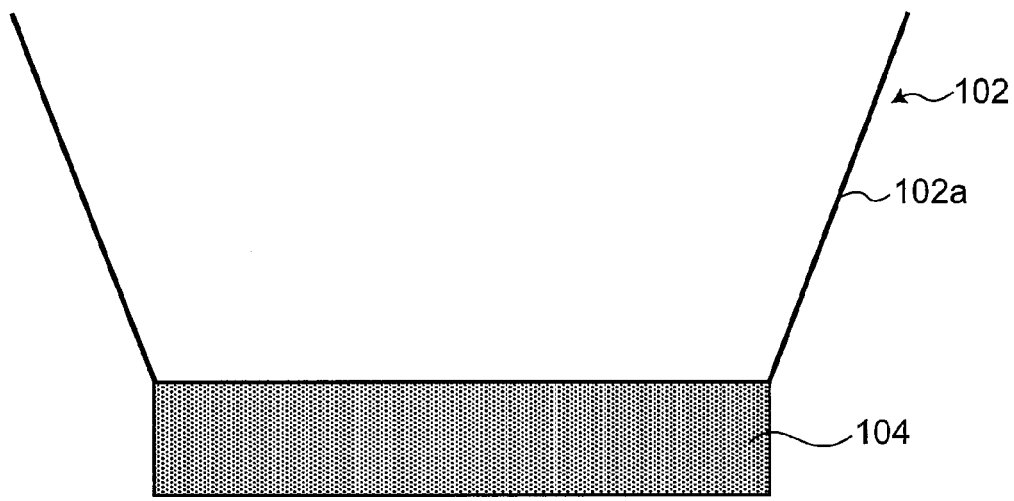
FIG. 4A is an enlarged sectional view exemplifying a state where a water-repellent particle layer is eroded partially.

FIG. 4A shows a state before the liquid 4a is introduced to the water tank 102. In this figure, only a part of the water tank 102 and the water-repellent particle layer 104 are enlarged in the desalination apparatus 1A. Exemplified below is a case where the water-repellent particle layer 104 has a flat top surface and the liquid 4a is introduced from the opening of the water tank 102 along the upper side wall 102a of the water tank 102.

<FIG. 4B>

Figure 4B:
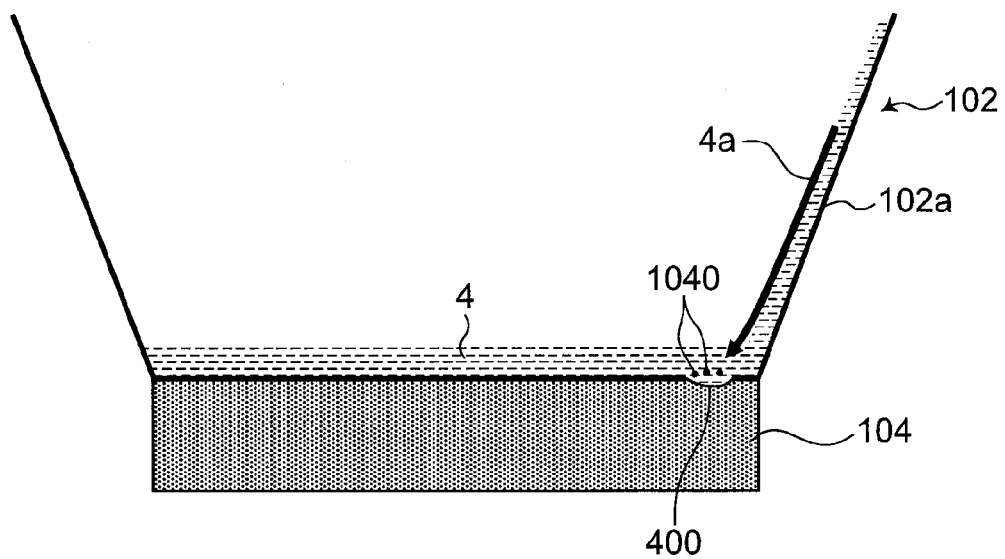
FIG. 4B is an enlarged sectional view exemplifying a state where a water-repellent particle layer is eroded partially.

FIG. 4B shows a state where the liquid 4a is introduced to the water tank 102 from the opening of the water tank 102 along the upper side wall 102a. The downward arrow indicates the flow of the liquid 4a. The dotted line in the water tank 102 indicates the liquid layer 4 that is reserved in the water tank 102. When the liquid 4a is introduced to the water tank 102, the liquid 4a is reserved to form the liquid layer 4 on the water-repellent particle layer 104. The flow of the introduced liquid 4a causes the water-repellent particles of the water-repellent particle layer 104 to partially fly upward and float in the liquid layer 4, so as to partially erode water-repellent particles 1040 at the surface of a portion through which the liquid 4a is introduced in the surface of the water-repellent particle layer 104. The surface of the portion through which the liquid 4a is introduced in the surface of the water-repellent particle layer 104 is eroded partially, so that the surface of the portion through which the liquid 4a is introduced in the surface of the water-repellent particle layer 104 is partially provided with a concave portion 400. In other words, the water-repellent particles 1040 at the surface of the water-repellent particle layer 104 partially shift away and the surface of the water-repellent particle layer 104 partially has a recess (the concave portion 400). The water-repellent particles 1040 at the water-repellent particle layer 104 located at the portion through which the liquid 4a is introduced and where the concave portion 400 is provided fly upward into the liquid layer 4 and float in the liquid layer 4.

<FIG. 4C>

Figure 4C:
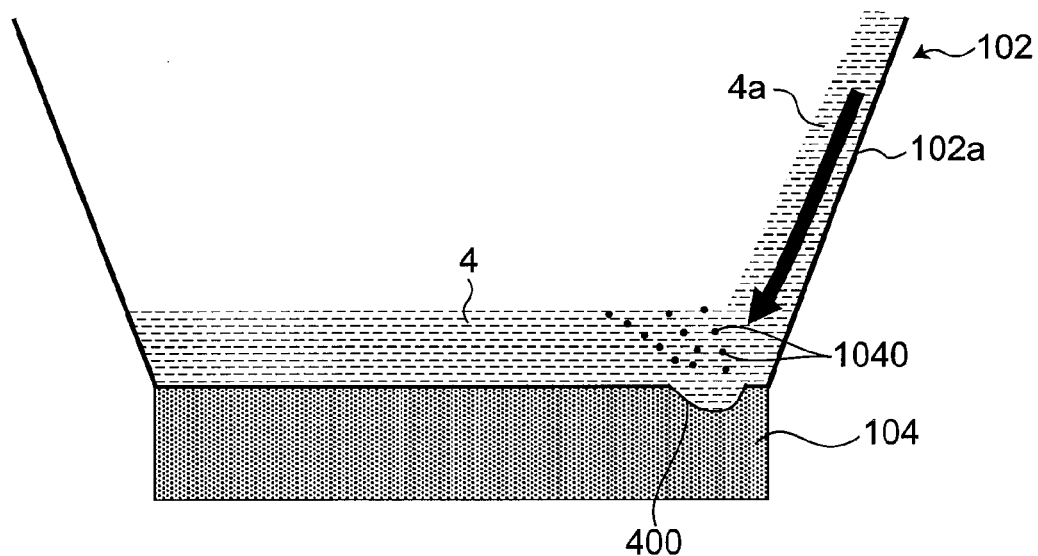
FIG. 4C is an enlarged sectional view exemplifying a state where a water-repellent particle layer is eroded partially.

FIG. 4C shows a state where the liquid 4a is introduced at a larger flow rate to the water tank 102 from the state of FIG. 4B. Similarly to FIG. 4B, the flow of the additionally introduced liquid 4a further erodes partially the portion through which the liquid is introduced in the surface of the water-repellent particle layer 104 (where the concave portion 400 is provided). The additional introduction of the liquid 4a further increases the depth of the concave portion 400. The flow of the liquid 4a shifts the water-repellent particles 1040 additionally floating in the liquid layer 4 mainly in the direction away from the concave portion 400 in the liquid layer 4.

<FIG. 4D>

Figure 4D:
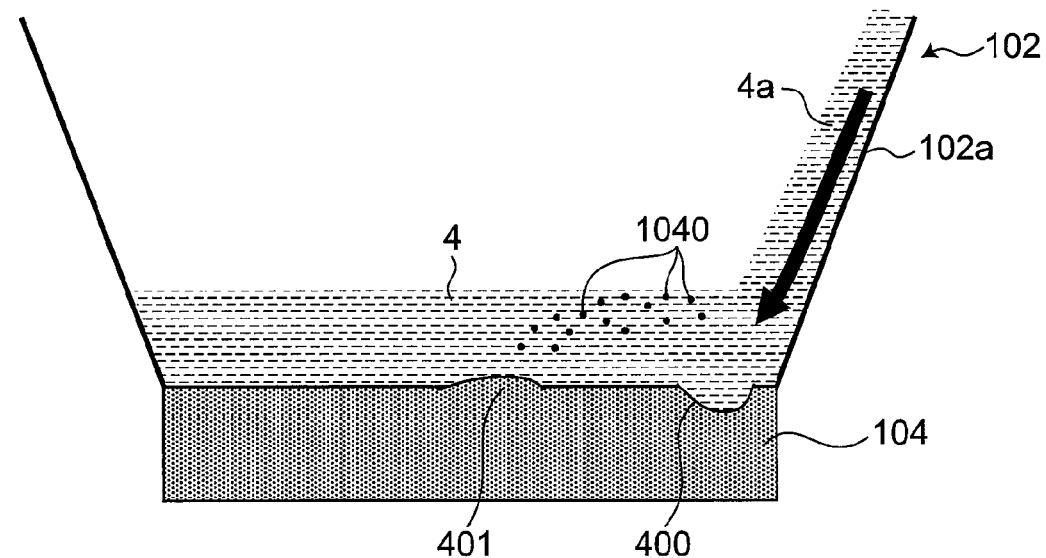
FIG. 4D is an enlarged sectional view exemplifying a state where a water-repellent particle layer is eroded partially.

FIG. 4D shows a state where the water-repellent particles 1040 floating in the liquid layer 4 accumulate on the surface of the portion other than the concave portion 400 in the surface of the water-repellent particle layer 104. The water-repellent particles 1040 accumulate to partially form a plurality of convex portions 401 at the surface of the portion other than the concave portion 400 in the surface of the water-repellent particle layer 104.

<FIG. 4E>

Figure 4E:
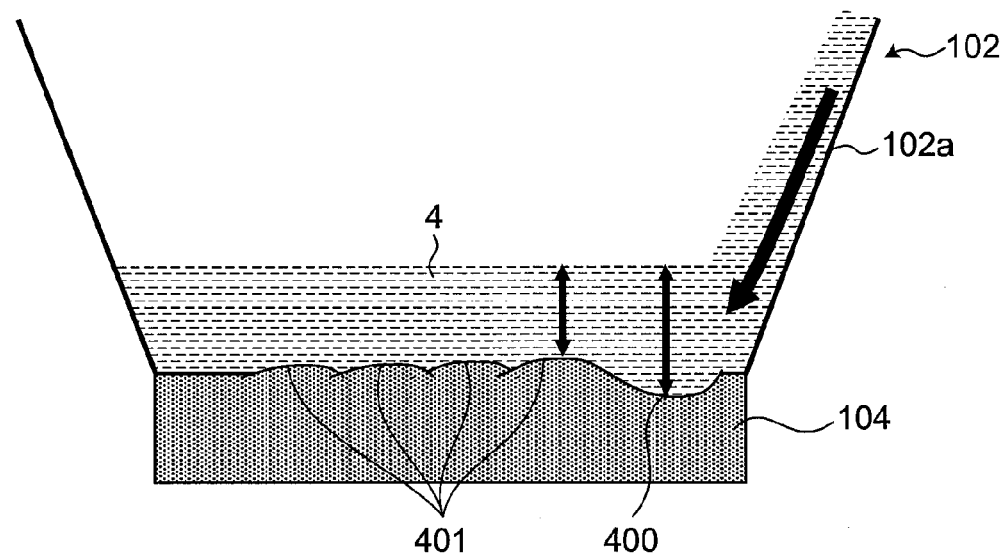
FIG. 4E is an enlarged sectional view exemplifying a state where a water-repellent particle layer is eroded partially.

FIG. 4E shows a state where the liquid layer 4 is formed to have a predetermined level (a level less than a water pressure resistance). Introduction of the liquid 4a to the water tank 102 is stopped in this state. As shown in FIGS. 4C and 4D, the liquid 4a introduced to the water tank 102 partially erodes the water-repellent particle layer 104, so that the concave portion 400 and the convex portions 401 are formed at the surface of the water-repellent particle layer 104. In other words, the top surface of the water-repellent particle layer 104 does not have a constant (planar) level but has the concave and convex portions of different levels, so that the level of the liquid layer 4 is partially different. For example, the introduced flow of the liquid 4a is varied in accordance with change in level of the liquid layer 4 in the water tank 104 while the liquid 4a is introduced. The water-repellent particles 1040 floating in the liquid layer 4 are accumulated at different positions of the water-repellent particle layer 104 due to the change in flow of the liquid 4a, so that the plurality of convex portions 401 are formed.

Accordingly, as shown in FIG. 4E, the surface of the water-repellent particle layer 104 can possibly have at least one concave portion 400 and the plurality of convex portions

401. The number of the concave portion 400 is not limited to 1, but the surface of the water-repellent particle layer 104 can possibly have a plurality of concave portions 400 in accordance with the flow of the liquid 4a introduced to the water tank 102 or the method of introducing the liquid 4a.

<FIG. 4F>

After the liquid layer 4 is formed as shown in FIG. 4E, the desalination apparatus 1A performs desalination processing in the steps S102 and S103. The desalination processing evaporates the liquid of the liquid layer 4 into water vapor that shifts away from the liquid layer 4 and thus decreases the level of the liquid layer 4. Additional liquid 4a is thus introduced to the water tank 102.

<FIG. 4G>

The additional liquid 4a introduced to the water tank 102 partially erodes the particles 1040 at the surface of the water-repellent particle layer 104, similarly to the state shown in FIG. 4C. When the liquid 4a is introduced from the same location of the water tank 102, the concave portion 400 is increased in depth.

<FIG. 4H>

The water-repellent particles 1040 floating in the liquid layer 4 are accumulated on the surface of the water-repellent particle layer 104 to form convex portions 401 at the surface of the water-repellent particle layer 104. The convex portions 401 are increased in level when the water-repellent particles 1040 are accumulated on the portions already provided with the convex portions 401.

<FIG. 4I>

As shown in FIGS. 4A to 4H, the concave portion 400 and the plurality of convex portions 401 are formed at the surface of the water-repellent particle layer 104 when the liquid layer 4 is formed.

Figure 4F:
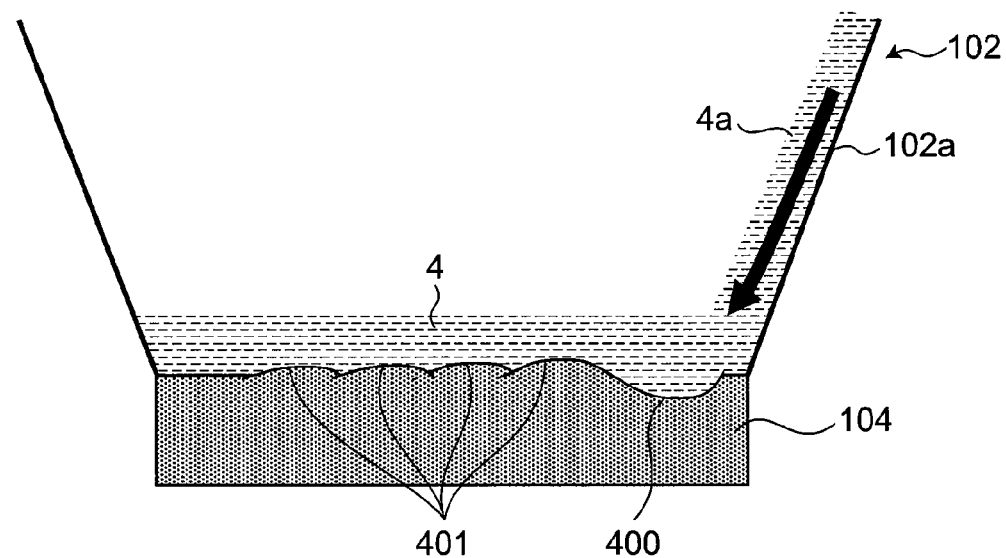
FIG. 4F is an enlarged sectional view exemplifying a state where a water-repellent particle layer is eroded partially.
Figure 4G:
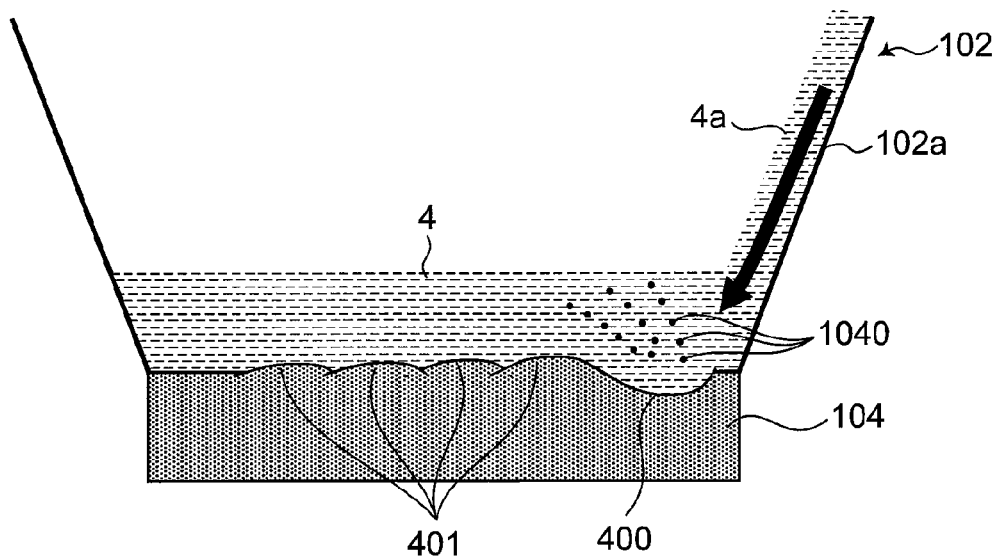
FIG. 4G is an enlarged sectional view exemplifying a state where a water-repellent particle layer is eroded partially.
Figure 4H:
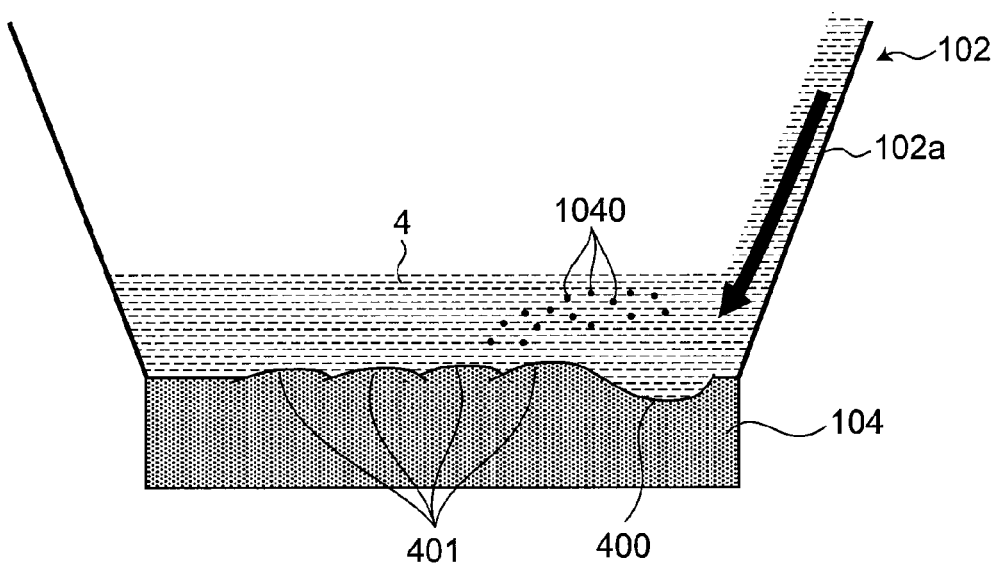
FIG. 4H is an enlarged sectional view exemplifying a state where a water-repellent particle layer is eroded partially.
Figure 4I:
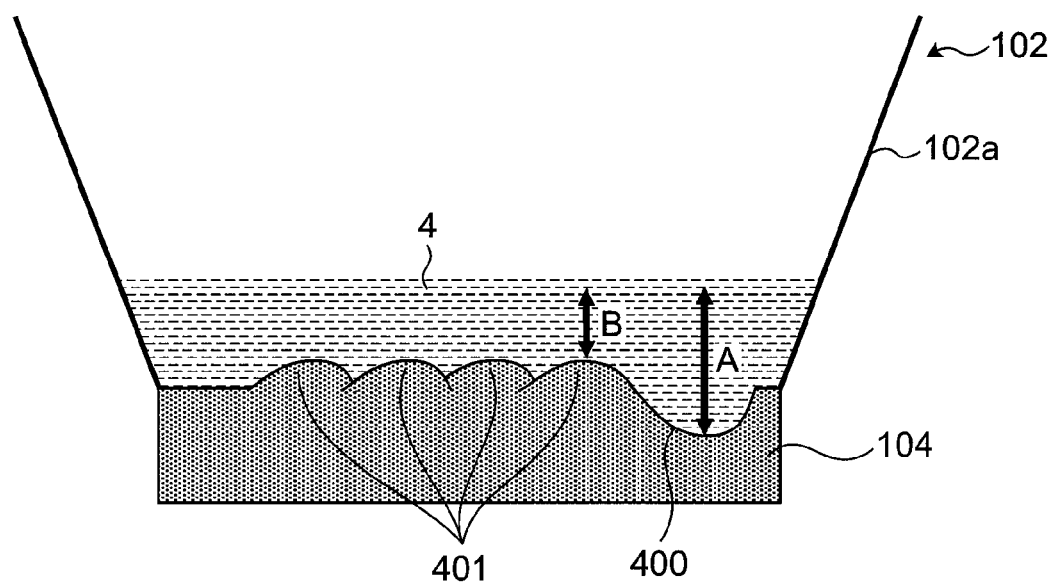
FIG. 4I is an enlarged sectional view exemplifying a state where a water-repellent particle layer is eroded partially.

In FIG. 4I, the distance between the bottom surface (e.g. the most recessed portion) of the concave portion 400 and the top surface of the liquid layer 4 is denoted by A, and the distance between the top surface (e.g. the most projecting portion) of the convex portion 401 and the top surface of the liquid layer 4 is denoted by B. The top surface of the liquid layer 4 is also called a "water surface".

As described above, even when the top surface (water surface) of the liquid layer 4 is constant, the distance A between the bottom surface of the concave portion 400 and the water surface is larger than the distance B between the top surface of the convex portion 401 and the water surface. Pressure applied to the water-repellent particle layer 104 depends on the distance between the water-repellent particle layer 104 and the water surface, so that the concave portion 400 at the water-repellent particle layer 104 receives pressure different from pressure applied to the convex portion 401 at the water-repellent particle layer 104.

When liquid is introduced to the water tank 102 with no consideration that the concave portion 400 and the convex portions 401 are formed at the surface of the water-repellent particle layer 104, the liquid 4a exceeding water pressure resistance is introduced at a part of the water-repellent particle layer 104. In such a case, the water-repellent particle layer 104 cannot hold the liquid 4a so that the liquid enters (breaks) the water-repellent particle layer 104.

For example, when the water-repellent particle layer 104 is provided thereon with the liquid layer 4 of a predetermined level (a level less than water pressure resistance) with reference to the planar surface of the water-repellent particle layer 104 prior to erosion, the concave portion 400 receives pressure equal to or more than pressure applied to the reference planar surface (pressure exceeding water pressure resistance) and the water-repellent particle layer 104 can be broken at the concave portion 400.

As shown in FIGS. 4F to 4H, even when the liquid 4a is introduced so as to form a liquid layer 4 as thick as the liquid layer 104 prior to desalination processing, the water-repellent particle layer 104 can be possibly eroded partially so that pressure applied to the eroded portion (the concave portion 400) at the water-repellent particle layer 104 increases to exceed predetermined water pressure resistance and the water-repellent particle layer 104 is broken at the concave portion 400.

FIGS. 4A to 4I exemplify the case where the water-repellent particle layer 104 is eroded when the liquid 4a is introduced to the water tank 102. The water-repellent particle layer 104 will be eroded also when wind force applied to the top surface of the liquid layer 4 generates a flow of the liquid 4a.

The present inventors devised the present disclosure of, in view of the fact that the water-repellent particles 1040 at the eroded portion of the water-repellent particle layer 104 float in the liquid layer 4, preliminarily detecting a state before breakage of the water-repellent particle layer 104 to enable efficient desalination. Described below is a detailed configuration of the desalination system 2 according to the first embodiment.

Figure 5B:
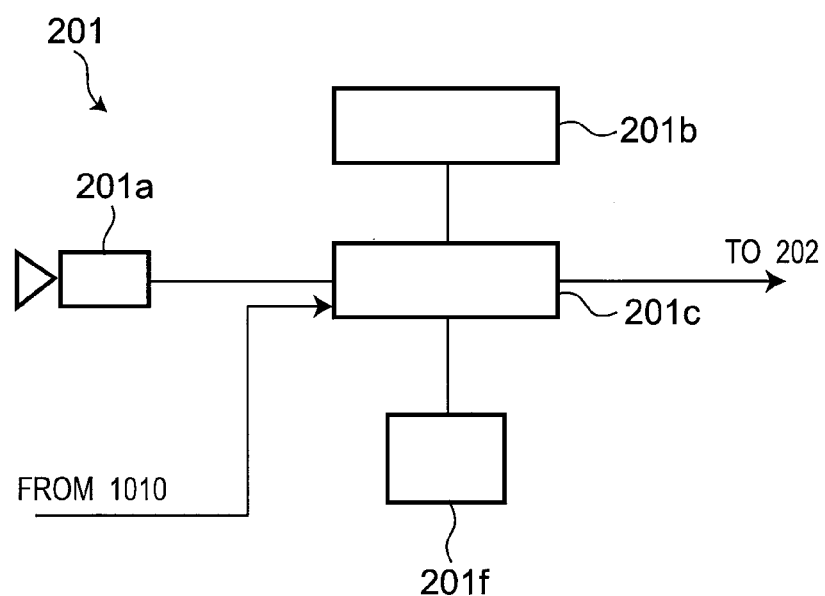
FIG. 5B is a block diagram showing a configuration of a particle measuring unit in the desalination system according to the first embodiment.

The desalination system 2 according to the first embodiment shown in FIGS. 5A and 5B at least includes the water tank 102, a water-repellent particle layer 104A, the devolatilizing layer 105, a particle measuring unit 201, a decision unit 202, and a controller 203. The desalination system 2 also includes the desalination apparatus 1 that has the water tank 102, the water-repellent particle layer 104A, and the devolatilizing layer 105. The desalination apparatus 1 has basic functions same as those of the desalination apparatuses 1A and 1B already described. The desalination apparatus 1 is different from the desalination apparatuses 1A and 1B in the configuration of the water-repellent particle layer 104A in view of particle measurement. Configurations which are included in the desalination apparatus 1B and its desalination system 2B and are not mentioned in the following disclosure of the desalination apparatus 1 and its desalination system 2 are applicable where appropriate in a modification example of the first embodiment.

A measurement system 21 includes the particle measuring unit 201, the decision unit 202, and the controller 203. The decision unit 202 is connected wiredly or wirelessly to the particle measuring unit 201 and the controller 203 to transmit and receive information. The desalination apparatus 1 includes the water tank 102, the water-repellent particle layer 104A, and the devolatilizing layer 105.

<Water-Repellent Particle Layer 104A>

Figure 6:
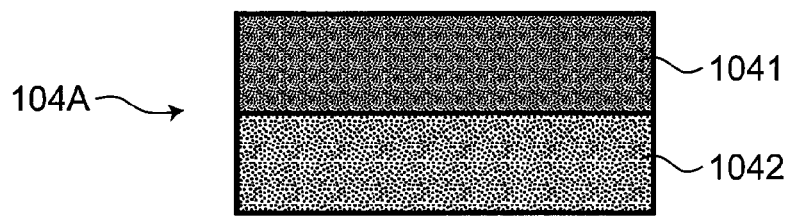
FIG. 6 is an enlarged sectional view of the water-repellent particle layer in the desalination system according to the first embodiment.

The water-repellent particle layer 104A has a plurality of layers each having discriminable water-repellent particles. More specifically, the water-repellent particle layer 104A shown in FIG. 6 has a first particle layer 1041 and a second particle layer 1042. As shown in FIG. 6, the first particle layer 1041 and the second particle layer 1042 are disposed in the mentioned order from the top to the bottom.

The first particle layer 1041 and the second particle layer 1042 include water-repellent particles in colors different from each other. Such different colors are expressed by difference in hue, lightness, chroma, brightness, or the like. The particles of the first particle layer 1041 and the second particle layer 1042 have colors different from that of the liquid in the water tank 102.

The first particle layer 1041 and the second particle layer 1042 include water-repellent particles in colors different from each other, so that the following effects are expected. At an early stage of the desalination processing, only the water-repellent particles in the color of the first particle layer 1041 are floating in the liquid layer 4. As the desalination processing continues, the water-repellent particles in the color of the second particle layer 1042 start floating in the liquid layer 4. This phenomenon indicates that the first particle layer 1041 is eroded partially and the surface of the second particle layer 1042 is partially in contact with the liquid layer 4. As to be described later, it is possible to estimate the depth of the concave portion 400 at the water-repellent particle layer 104 by measuring the particles in the color of the second particle layer 1042.

For example, the first particle layer 1041 has blue particles and the second particle layer 1042 has red particles. Such blue and red particles are each obtained by coating, with a water-repellent film, the surface of a particle preliminarily colored using appropriate pigment.

For example, the surface of a particle can be colored into blue or red using appropriate pigment. It is possible to use a known material as the pigment used for coloring the surface of the particle into blue or red. Examples of blue pigment include a material of cobalt or manganese series. Examples of red pigment include a material of trilead tetraoxide series or red iron oxide series. It is possible to alternatively use a particle in blue or red.

When the entire thickness of the water-repellent particle layer 104A (a sum of the thickness of the first particle layer 1041 and the thickness of the second particle layer 1042) is made to have a constant value, the thickness of the first particle layer 1041 can be made relatively smaller than the thickness of the second particle layer 1042. This configuration enables earlier detection of erosion of the first particle layer 1041 in the water-repellent particle layer 104A.

Alternatively, when the water-repellent particle layer 104A has a planar surface, the level of the liquid layer 4 and the thickness of the first particle layer 1041 can each have a predetermined ratio to the degree of water pressure resistance of the water-repellent particle layer 104A in view of a safety coefficient. For example, the predetermined ratio is 80%. When the level of the liquid layer 4 is 15 cm in a case where the water-repellent particle layer 104A has a water pressure resistance of 30 cm and the water-repellent particle layer 104A has a planar surface, the thickness of the first particle layer 1041 can be calculated as (30 cm×80%)−15 cm=9 cm. The first particle layer 1041 is thus formed to have 9 cm in thickness.

<Particle Measuring Unit 201>

The particle measuring unit 201 measures the amount of water-repellent particles in each color (at least the color of the second water-repellent particles), which are floating in the liquid layer 4. For example, the particle measuring unit 201 measures the amount of the first water-repellent particles of the first particle layer 1041 and the amount of the second water-repellent particles of the second particle layer 1042 per constant period.

An exemplary particle measuring unit 201 includes a camera 201a for capturing an image of the water surface of the liquid layer 4, a calculator 201c, and a storage unit 201b. The camera 201a is preferably capable of capturing a colored image. The particle measuring unit 201 preliminarily stores in the storage unit 201b, sizes of the first water-repellent particles of the first particle layer 1041 as well as the second water-repellent particles of the second particle layer 1042, and/or agglomerate of a plurality of water-repellent particles. The calculator 201b analyzes the image captured by the camera 201a in accordance with the preliminarily stored sizes of the water-repellent particles and/or the agglomerate. The calculator 201b obtains the number of the water-repellent particles and/or the agglomerate having the preliminarily stored sizes. Alternatively, the particle measuring unit 201 stores in the storage unit 201c reference values of areas in the respective colors of the first water-repellent particle of the first particle layer 1041 and the second water-repellent particle of the second particle layer 1042. The calculator 201b analyzes the image captured by the camera 201a in accordance with the preliminarily stored reference values. The calculator 201b obtains areas of the water-repellent particles in the predetermined colors in the image captured by the camera.

Figure 7A:
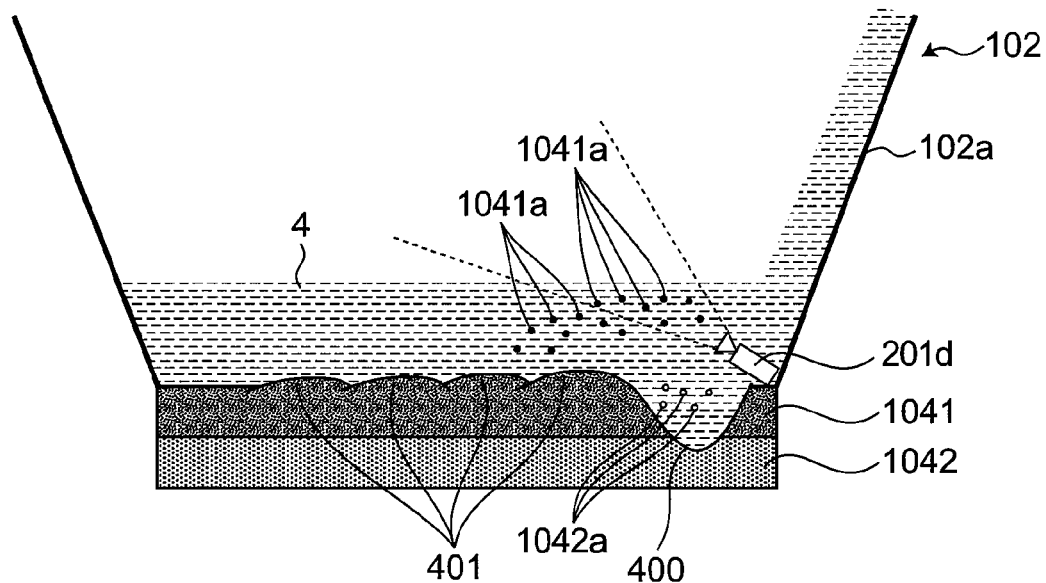
FIG. 7A is a partially sectional explanatory view illustrating a location of a camera in the desalination system according to the first embodiment.
Figure 7B:
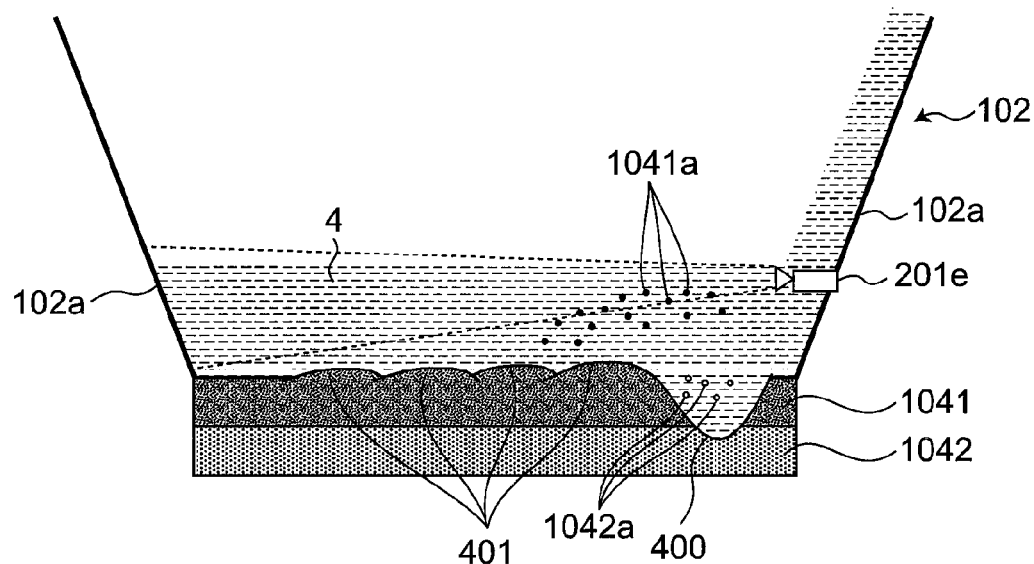
FIG. 7B is a partially sectional explanatory view illustrating a location of another camera in the desalination system according to the first embodiment.

FIGS. 7A and 7B exemplify locations of cameras 201d and 201e, respectively, when the camera 201a in the particle measuring unit 201 is embodied as the camera 201d or 201e. The cameras 201d and 201e shown in FIGS. 7A and 7B respectively each capture an image of a region between two dotted lines extending from the corresponding one of the cameras 201d and 201e. The camera 201d exemplified in FIG. 7A is located on the upper side wall 102a in order to capture the upper surface and the inside near the upper surface of the liquid layer 4. The camera 201e exemplified in FIG. 7B is located on the upper side wall 102a in order to capture the inside of the liquid layer 4. The camera 201e is located at an angle for capturing the upper side wall 102a facing the upper side wall 102a provided with the camera 201e through the inside of the liquid layer 4. In other words, the cameras 201d and 201e are each located at an angle for not capturing the surface of the water-repellent particle layer 104A in the color same as that of the floating water-repellent particles 1040 so that the amount of the water-repellent particles 1040 floating in the liquid layer 4 can be decided in accordance with the captured image.

As another example of the particle measuring unit 201, a particle concentration gauge 201f measures concentration of the liquid particles in the liquid layer 4. A known particle concentration gauge can be used as the particle concentration gauge 201f.

Figure 7C:
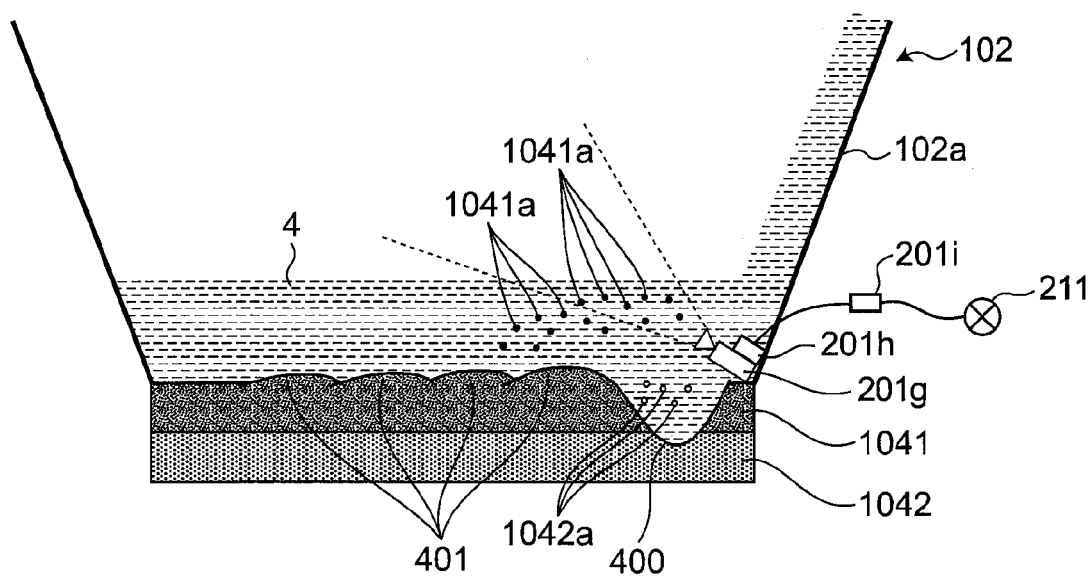
FIG. 7C is a partially sectional explanatory view illustrating a location of a particle concentration gauge including a light source in the desalination system according to the first embodiment.
Figure 7D:
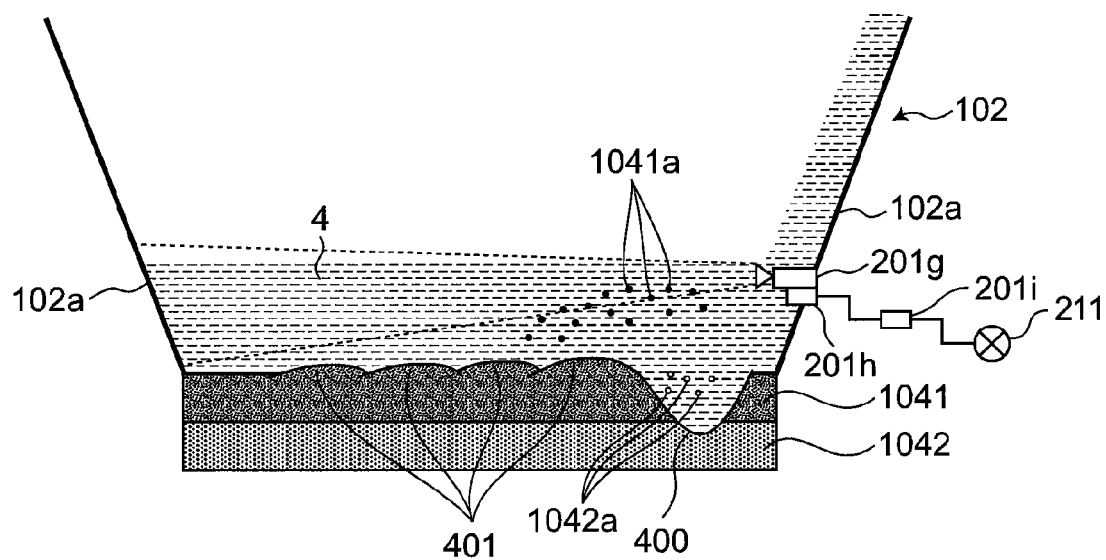
FIG. 7D is a partially sectional explanatory view illustrating a location of a particle concentration gauge including another light source in the desalination system according to the first embodiment.

As shown in FIGS. 7C and 7D, the particle concentration gauge 201f includes a light source 201g, a light receiver 201h, and a counter 201i. The light source 201g is located on the upper side wall 201a of the water tank 201. The light source 201g is located at a position similar to the position of the camera 201d or 201e. The light receiver 201h is located on the upper side wall 201a.

The light source 201g emits light toward the liquid layer 4 in the water tank 102. The emitted light is reflected at the water-repellent particles 1040 floating in the liquid layer 4. The light receiver 201h receives the light reflected at the water-repellent particles 1040. The counter 201i outputs, through a network line 211, particle concentration corresponding to intensity of the light received by the light receiver 201i in accordance with preliminarily held relationship between intensity of light and particle concentration.

The particle measuring unit 201 transmits, to the decision unit 202, the amount of the second water-repellent particles associated with measurement time. In an example, the particle measuring unit 201 has a time measuring unit 201f for measuring time. The particle measuring unit 201 thus configured can transmit, through the network line 211 or the like to the decision unit 202, the amounts of the water-repellent particles in the respective colors associated with measurement time. The amounts of the water-repellent particles in the respective colors can be associated not with such information on measurement time but with information on whether or not the time is included in a period of introducing the liquid 4a to the water tank 102. Alternatively, the measurement results can be transmitted to the decision unit 202 if the liquid 4a is introduced to the water tank 102.

If the water tank 102 has the water gate 101, the particle measuring unit 201 can acquire the information on whether or not the time is included in the period of introducing the liquid 4a in accordance with information on opening/closing of the water gate 101. In this case, the time is assumed to be included in the period of introducing the liquid 4a if the water gate 101 is opened. The particle measuring unit 201 acquires the information on opening/closing of the water gate 101 from the water gate controller 1010 for controlling opening/closing of the water gate 101.

The particle measuring unit 201 optionally has a water surface measuring unit for measuring the water surface in the water tank 102. In this case, the time can be assumed to be included in the period of introducing the liquid 4a when the surface is higher by at least a certain degree than a predetermined reference level or when the water surface is higher by at least a predetermined value at certain time.

<Decision Unit 202>

The decision unit 202 receives the amounts of the water-repellent particles in the respective colors measured by the particle measuring unit 201. The decision unit 202 holds an amount of water-repellent particles in a predetermined color as a reference value. The decision unit 202 can acquire, from a reference value hold unit 206 provided separately from the decision unit 202, the reference value as the amount of the water-repellent particles in the predetermined color. For example, the amount of water-repellent particles is expressed by the number of the particles, concentration of the particles, or an area occupied by particles in an image captured by the camera. The amount of the water-repellent particles can have an absolute value or a ratio.

The decision unit 202 decides whether or not the amount of the water-repellent particles in the predetermined color received from the particle measuring unit 201 is equal to or more than the reference value.

Examples of the reference value include a color and a predetermined amount of the particles of the second particle layer 1042. The phenomenon that second water-repellent particles 1042a of the second particle layer 1042 are floating in the liquid layer 4 indicates that the first particle layer 1041 on the second particle layer 1042 is eroded partially and removed, the second particle layer 1042 starts being eroded, and the second water-repellent particles 1042a are floating. With this reference value, it is thus possible to find that the water-repellent particle layer 104A is eroded and a concave portion 400 having a certain or more level is formed.

Other examples of the reference value include a predetermined amount of all of the measured particles in the colors including the color of the second particle layer 1042. With this reference value, it is possible to find that the concave portion 400 has a certain or more level and that the liquid has such a strong flow as floating a predetermined or more amount of the second water-repellent particles 1042a in the liquid layer 4.

The predetermined amount can be an amount in a certain period. The predetermined amount can be a total amount in all time sections from initial formation of the liquid layer 4 to repair for eliminating the concave portion 400 at the surface of the water-repellent particle layer 104A. The decision unit 202 decides whether or not the sum of the amounts of the water-repellent particles at constant time points acquired from the particle measuring unit 201 is equal to or more than the reference value. The decision unit 202 transmits the decision result to the controller 203. The decision unit 204 initializes the summed amount of the water-repellent particles when acquiring repair information from a repair unit 204 to be described later.

As shown in FIGS. 4F to 4I, when additional liquid 4a is introduced after the desalination processing, the concave portion 400 is thus gradually increased in level at the water-repellent particle layer 104A. With the reference value of the total amount in all the sections, it is possible to know the state of the concave portion 400, which is deepened as the desalination processing progresses, and predict breakage of the water-repellent particle layer 104A. The reference value can be received from a user or the like through the input unit 1011. Change from the reference value can be received also through the input unit 1011. For example, when observing strong wind, the user can set or change the reference value in view of the fact that larger force is applied to the liquid layer 4 in the water tank 102.

The decision unit 202 makes the decision processing in every predetermined period. Examples of the predetermined period include a period from 1 to 10 minutes. Alternatively, the decision unit 202 can shorten the predetermined period while the liquid 4a is introduced to the water tank 102. The decision unit 202 acquires from the water gate controller 1010 information on the period of introducing the liquid 4a to the water tank 102.

<Controller 203>

When the decision unit 202 decides that the amount of the water-repellent particles in the predetermined color is equal to or more than the reference value, in accordance with the decision result, the controller 203 transmits, to an output unit 205, an alert or a command (signal) to adjust the amount of the liquid of the liquid layer 4.

The controller 203 transmits, to a voice output unit as an example of the output unit 205, a command (signal) to make warning sound. The controller 203 alternatively transmits, to a display device 2031 (see FIG. 8) as another example of the output unit 205, a command (signal) to display possible presence of a risk of breakage of the water-repellent particle layer 104A. The display device 2031 can display only possible presence of a risk of breakage.

Still alternatively, the controller 203 transmits, to the water gate controller 1010, a command (signal) to adjust the amount of the liquid of the liquid layer 4. For example, when the decision unit 202 decides that the amount of the water-repellent particles in the predetermined color is equal to or more than the reference value, the controller 203 adjusts to stop the introduction of the liquid or decrease the amount of the introduced liquid.

Adjustment of the amount of the liquid of the liquid layer 4 can be made, for example, by decreasing the amount of the liquid introduced to the water tank 102 per unit period so as to decrease speed of forming the liquid layer 4.

Further alternatively, the controller 203 transmits, to the repair unit 204 shown in FIG. 5C, a command (signal) to supply water-repellent particles to the water-repellent particle layer 104A for repair. For example, the controller 203 can command an amount of the water-repellent particles to be supplied for repair in accordance with the current amount of the water-repellent particles.

As shown in FIG. 5C, the repair unit 204 is located to be connected to the introduction path 101a. The repair unit 204 introduces liquid containing water-repellent particles along the introduction path 101a toward the concave portion 400, so as to decrease the depth of the concave portion 400 and eliminate the concave portion 400 for making repair. The water-repellent particle layer 104A is preferably repaired to include the two layers of the first particle layer 1041 and the second particle layer 1042 as similarly as possible to the initial state. For example, the second water-repellent particles 1042a along with liquid are initially introduced for a predetermined period corresponding to the amount of the floating second water-repellent particles 1042a, for repair of a removed portion of the second particle layer 1042. The water-repellent particles 1041a along with liquid are then introduced for a period necessary for forming a first particle layer 1041, for formation of the first particle layer 1041. In FIG. 5C, the configurations in common with those in FIG. 5A, such as the water gate controller 1010, are partially excluded for simplified illustration.

When the decision unit 202 decides that the amount of the water-repellent particles in the predetermined color is less than the reference value, in accordance with the decision result, the controller 203 does not need to issue a command.

Figure 8:
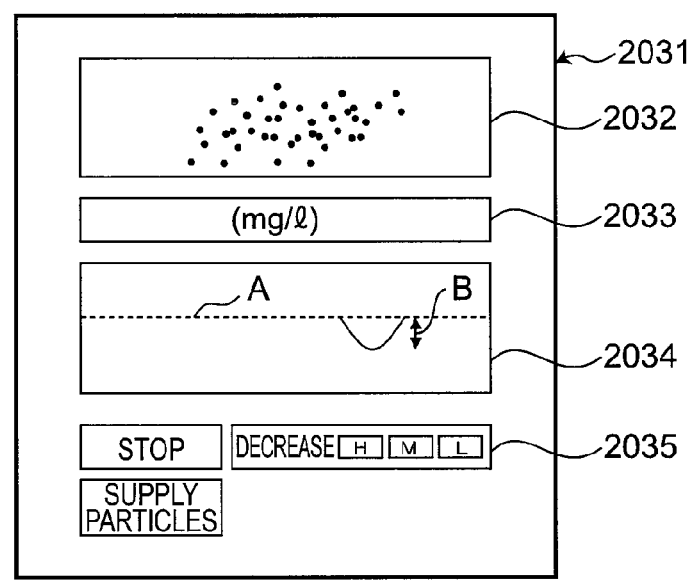
FIG. 8 is an explanatory view exemplifying display by a display device in the desalination system according to the first embodiment.

FIG. 8 exemplifies display at the display device 2031. The display device 2031 can display a camera image 2032, a water-repellent particle amount 2033, an estimated depth 2034 of the concave portion, and a control command 2035.

The camera image 2032 includes the water-repellent particles 1040 in the liquid measured by the particle measuring unit 201.

The water-repellent particle amount 2033 quantitatively indicates the amount of the water-repellent particles measured by the particle measuring unit 201. Examples of the amount of water-repellent particles include concentration (mg/l) of the water-repellent particles and an area (cm$^2$) of the water-repellent particles in an image.

The estimated depth 2034 of the concave portion indicates an estimated depth of the concave portion 400 in accordance with the amount of the water-repellent particles measured by the particle measuring unit 201. The depth of the concave portion 400 can be shown schematically as in FIG. 8, or can be indicated as a quantitative numerical value. In FIG. 8, in order to show the estimated depth of the concave portion 400, the surface of the water-repellent particle layer 104A prior to formation of the concave portion 400 is denoted by A and the depth of the concave portion 400 is denoted by B.

The control command 2035 includes stop of introduction of the liquid to the water tank 102, decrease in amount of the liquid introduced to the water tank 102, or introduction of water-repellent particles. Such decrease in amount of the liquid introduced to the water tank 102 can include a degree of the decrease using "H", "M", or "L". For example, "H" indicates decrease in introduced amount by an amount larger than predetermined reference, "M" indicates decrease by the amount equal to the reference, and "L" indicates decrease by an amount less than the reference.

The controller 203 includes a control input unit that receives a command to display at a control command unit 2035. The controller 203 can perform control in accordance with the received command.

<Repair Unit 204>

The repair unit 204 supplies water-repellent particles to the water-repellent particle layer 104 to decrease the depth of the concave portion 400. For example, when receiving a repair command from the controller 203, the repair unit 204 supplies the liquid to be introduced to the water tank 102 with water-repellent particles. The water-repellent particles are provided to the concave portion 400 along the flow of the liquid introduced to the water tank 102, so that the concave portion 400 is decreased in depth.

The repair unit 204 is located between the water gate 101 and a position on the introduction path 101a where the liquid is introduced to the water tank 102.

The repair unit 204 can decide the amount of the water-repellent particles to be supplied in accordance with the amount of the water-repellent particles acquired from the controller 203. The repair unit 204 can acquire the amount of the water-repellent particles from the particle measuring unit 201 or the decision unit 202 when receiving a repair command from the controller 203. For example, the repair unit 204 holds or acquires from the storage unit, correlation between a measured amount of water-repellent particles and an amount of water-repellent particles to be supplied. The repair unit 204 decides the amount of the water-repellent particles to be supplied in accordance with the correlation and the amount of the water-repellent particles thus acquired.

It is possible to supply the water-repellent particles to the eroded portion (the concave portion 400) at the water-repellent particle layer 104 by supplying the water-repellent particles to the liquid to be introduced to the water tank 102. The concave portion 400 is formed due to continuous desalination processing. There may thus be supplied the first water-repellent particles of an amount increased by a predetermined amount from the amount of water-repellent particles preliminarily decided in accordance with the correlation. Thus, it is possible to preliminarily form a convex portion made of the first water-repellent particles at a portion where the concave portion 400 is to be formed by erosion of the water-repellent particle layer 104A, so that water pressure resistance cannot be decreased by some erosion of the water-repellent particle layer 104A due to introduction of liquid.

<Processing by Measurement Processing System for Water-Repellent Particle Layer 104A>

Figures 9, 10:
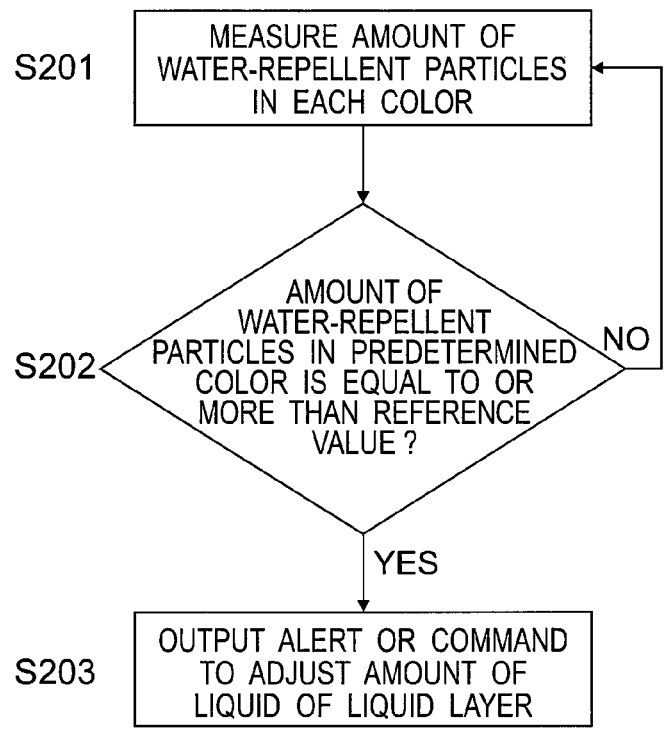
FIG. 9 is a flowchart of processing by a measurement system for the water-repellent particle layer.
FIG. 10 is a view exemplifying a reference value held by a decision unit or a reference hold unit.

FIG. 9 is a flowchart of measurement by the measurement system 21 for the water-repellent particle layer 104A.

<Step S201>

The particle measuring unit 201 measures the amount of the water-repellent particles in each color, which are floating in the liquid layer 4.

<Step S202>

The decision unit 202 decides whether or not the amount of the water-repellent particles in the predetermined color thus measured in step S201 is equal to or more than a liquid amount control deciding reference value.

FIG. 10 exemplifies the liquid amount control deciding reference value held by the decision unit 202 or the reference value hold unit 206. If the decision unit 202 decides that the amount of the water-repellent particles is equal to or more than the liquid amount control deciding reference value, the flow proceeds to step S203. If the decision unit 202 decides that the amount of the water-repellent particles is less than the liquid amount control deciding reference value, the flow returns to step S201.

<Step S203>

When the decision unit 202 decides that the amount of the water-repellent particles in the predetermined color is equal to or more than the liquid amount control deciding reference value, the controller 203 transmits, to the output unit 205, an alert or a command (signal) to adjust the amount of the liquid of the liquid layer 4.

The controller 203 can preliminarily hold a command for a case where the amount is equal to or more than the liquid amount control deciding reference value indicated in FIG. 10. The controller 203 can alternatively acquire a command stored in the reference value hold unit 206.

Modification Example 1

The first embodiment exemplifies the case where the first particle layer 1041 and the second particle layer 1042 include particles in colors different from each other. Instead of discrimination by color, the first particle layer 1041 and the second particle layer 1042 can include particles of particle diameters discriminably different from each other. For example, the first particle layer 1041 includes particles of particle diameters in a first range, and the second particle layer 1042 includes particles of particle diameters in a second range that is different from the first range with no overlap. The first particle layer 1041 and the second particle layer 1042 preferably include 80% or more particles within the first range and the second range, respectively.

Exemplified below is a case where the first range and the second range are discriminably different in size. For example, the particles of the first particle layer 1041 have particle diameters different by about 50% from those of the particles of the second particle layer 1042. In an example, the first range is from 5 mm to 1 mm and the second range is from 1.5 mm to 2 mm.

According to the first embodiment, the water-repellent particle layer 104A includes the two layers of the first particle layer 1041 and the second particle layer 1042 to hold the liquid. The particle measuring unit 201 measures the amount of the second water-repellent particles that float from the second particle layer 1042 into the liquid. This configuration enables accurate detection of the state where the first particle layer 1041 is eroded partially and the second particle layer 1042 starts being eroded. It is thus possible to previously prevent breakage of the water-repellent particle layer 104A. It is thus possible to efficiently and reliably perform automatic desalination processing.

Second Embodiment

Figure 11:
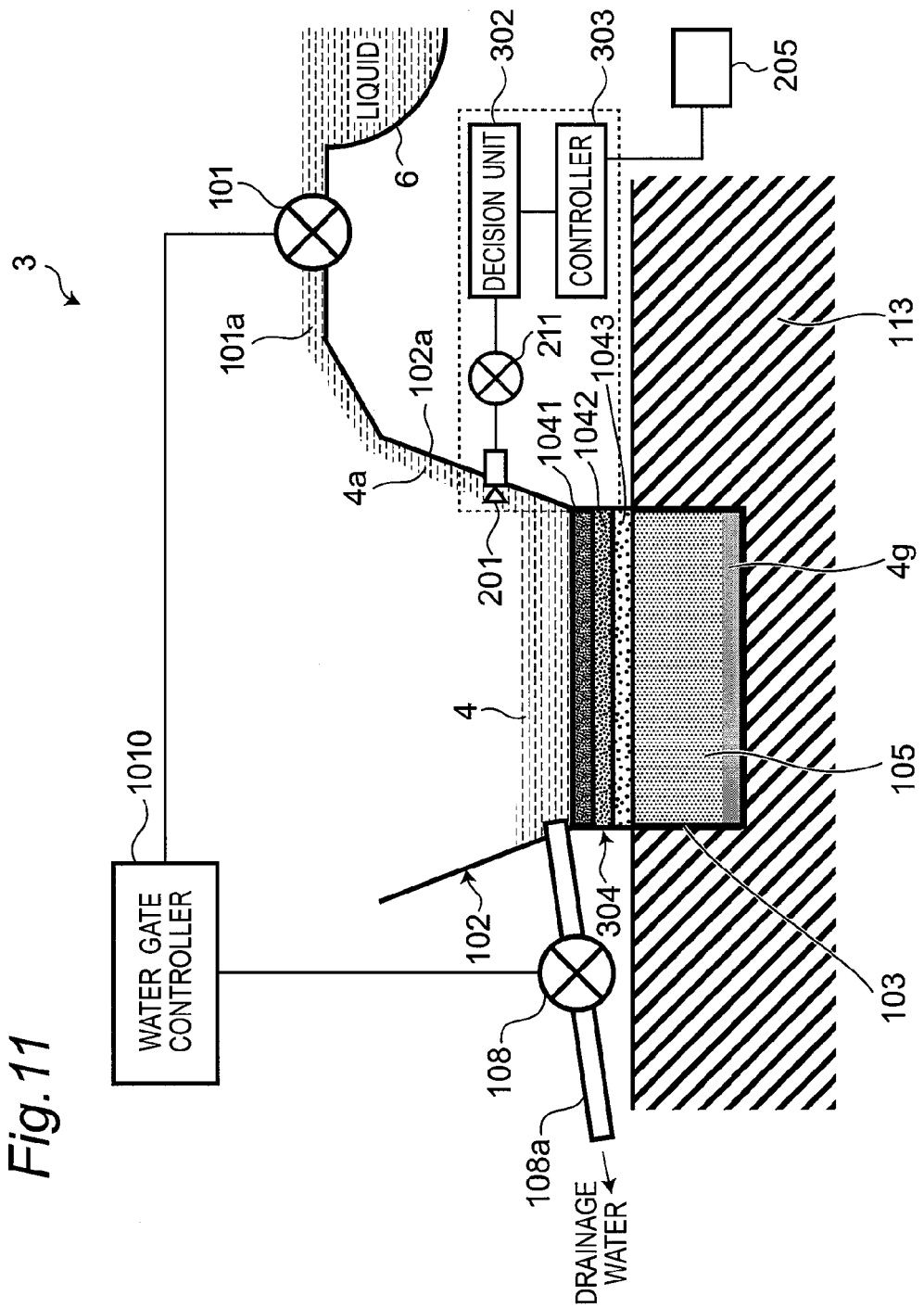
FIG. 11 is a view of a desalination system according to a second embodiment.

FIG. 11 shows a desalination system 3 according to the second embodiment. The desalination system 3 according to the second embodiment includes a water tank 102, a water-repellent particle layer 304, a devolatilizing layer 105, a particle measuring unit 201, a decision unit 302, and a controller 303. The water-repellent particle layer 104A in the desalination system 2 according to the first embodiment has the two layers, whereas the water-repellent particle layer 304 in the desalination system 3 according to the second embodiment has three or more layers. The desalination system 3 according to the second embodiment can be configured similarly to the desalination system 2 according to the first embodiment and its modification example, except for the water-repellent particle layer 304, the decision unit 302, and the controller 303.

<Water-Repellent Particle Layer 304>

The water-repellent particle layer 304 includes the three or more particle layers each composed of discriminable water-repellent particles. The particle layers have particles in colors different from each other. Such colors are expressed by hue, lightness, chroma, brightness, or the like.

Figures 12, 13:
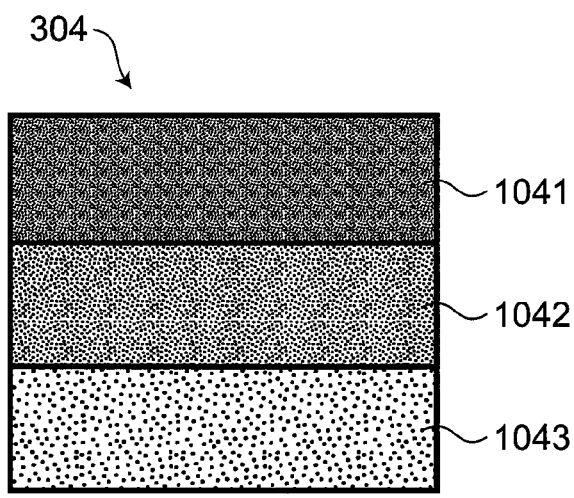
FIG. 12 is an enlarged sectional view of a water-repellent particle layer in the desalination system according to the second embodiment.
FIG. 13 is a view exemplifying reference values held by a decision unit and control by a controller in the desalination system according to the second embodiment.

As exemplified in FIG. 12, the water-repellent particle layer 304 has a first particle layer 1041, a second particle layer 1042, and a third particle layer 1043. The first particle layer 1041, the second particle layer 1042, and the third particle layer 1043 are disposed in the mentioned order from the top to the bottom.

For example, the first particle layer 1041 has blue particles, the second particle layer 1042 has green particles, and the third particle layer 1043 has red particles. Such blue, green, and red particles are each obtained by coating, with a water-repellent film, the surface of a particle preliminarily colored using appropriate pigment.

For example, the surface of a particle can be colored into blue, green, or red using appropriate pigment. It is possible to use a known material as the pigment used for coloring the surface of the particle into blue, green, or red. Examples of blue pigment include a material of a cobalt or manganese series. Examples of green pigment include a material of a phthalocyanine or azomethine series. Examples of red pigment include a material of a trilead tetraoxide or red iron oxide series. It is possible to alternatively use a particle in blue, green, or red.

The first particle layer 1041, the second particle layer 1042, and the third particle layer 1043 are composed of water-repellent particles in colors different from one another, so that the following effects are expected. Only the water-repellent particles in the color of the first particle layer 1041 are floating in the liquid layer 4 at the early stage of the desalination processing. Then, appearance of the color of the water-repellent particles of the second particle layer 1042 indicates that the first particle layer 1041 is eroded and removed at least partially. Subsequent appearance of the color of the water-repellent particles of the third particle layer 1043 indicates that the second particle layer 1042 is also eroded and removed at least partially. It is thus possible to implement, for example, two-step management including issuing an alert, decreasing the amount of the introduced liquid, or the like upon appearance of the color of the water-repellent particles of the second particle layer 1042, and immediately stopping introduction of the liquid or the like upon appearance of the color of the water-repellent particles of the third particle layer 1043.

The third particle layer 2043 can be thicker than the first particle layer 2041 and the second particle layer 2042. Alternatively, the third particle layer 2043, the second particle layer 2042, and the first particle layer 2041 can have thickness such that the third particle layer 2043 is the thickest and the first particle layer 2041 is the thinnest.

<Decision Unit 302>

The decision unit 302 receives the amounts of the water-repellent particles in the respective colors measured by the particle measuring unit 201. The decision unit 302 holds, as liquid amount control deciding reference values, amounts of water-repellent particles in predetermined colors (at least the color of the second water-repellent particles and the color of the third water-repellent particles). For example, the amount of water-repellent particles is expressed by the number of the particles, concentration of the particles, or an area occupied by particles in an image captured by the camera.

The decision unit 302 decides whether or not each of the amounts of the water-repellent particles in the predetermined colors thus received from the decision unit 302 is equal to or more than corresponding one of the liquid amount control deciding reference values.

Since the water-repellent particle layer 104 has the three or more layers, the liquid amount control deciding reference values thus set enable decision on three or more values.

<Controller 303>

When the decision unit 302 decides that the amount of the water-repellent particles in the predetermined color is equal to or more than the liquid amount control deciding reference value, the controller 303 transmits, to the output unit 205, an alert or a command (signal) to adjust the amount of the liquid of the liquid layer 4.

For example, the controller 303 transmits, to a voice output unit as an example of the output unit 205, a command (signal) to make warning sound. The controller 303 alternatively transmits, to a display device as another example of the output unit 205, a command (signal) to display possible presence of a risk of breakage of the water-repellent particle layer 304. Display of an alert includes display of the amount of the water-repellent particles in the predetermined color equal to or more than the liquid amount control deciding reference value.

When the decision unit 302 decides that the amount of the water-repellent particles in the predetermined color is less than the liquid amount control deciding reference value, the controller 303 does not need to issue a command.

FIG. 13 exemplifies the liquid amount control deciding reference value held by the decision unit 302 and control by the controller 303. The decision unit 302 holds, as the liquid amount control deciding reference values, a predetermined amount of particles in the color of the second particles and a predetermined amount of particles in the color of the third particles. When the decision unit 302 decides that there are a predetermined or more amount of particles in the color of the second particle layer 1042, the controller 303 transmits to the water gate controller 1010 a command (signal) to decrease the amount of the liquid introduced to the water tank 102. Furthermore, when the decision unit 302 decides that there are a predetermined or more amount of particles in the color of the third particle layer 1043, the controller 303 transmits to the water gate controller 1010 a command (signal) to stop introduction of the liquid to the water tank 102.

According to the second embodiment, the water-repellent particle layer 304 includes the three or more particle layers 1041, 1042, and 1043 each composed of discriminable water-repellent particles. It is thus possible to accurately implement two-step management including issuing an alert, decreasing the amount of the introduced liquid, or the like upon appearance of the color of the water-repellent particles of the second particle layer 1042, and immediately stopping introduction of the liquid or the like upon appearance of the color of the water-repellent particles of the third particle layer 1043. It is thus possible to more accurately and effectively prevent breakage of the water-repellent particle layer 104A and more efficiently perform automatic desalination processing.

Third Embodiment

Figure 14:
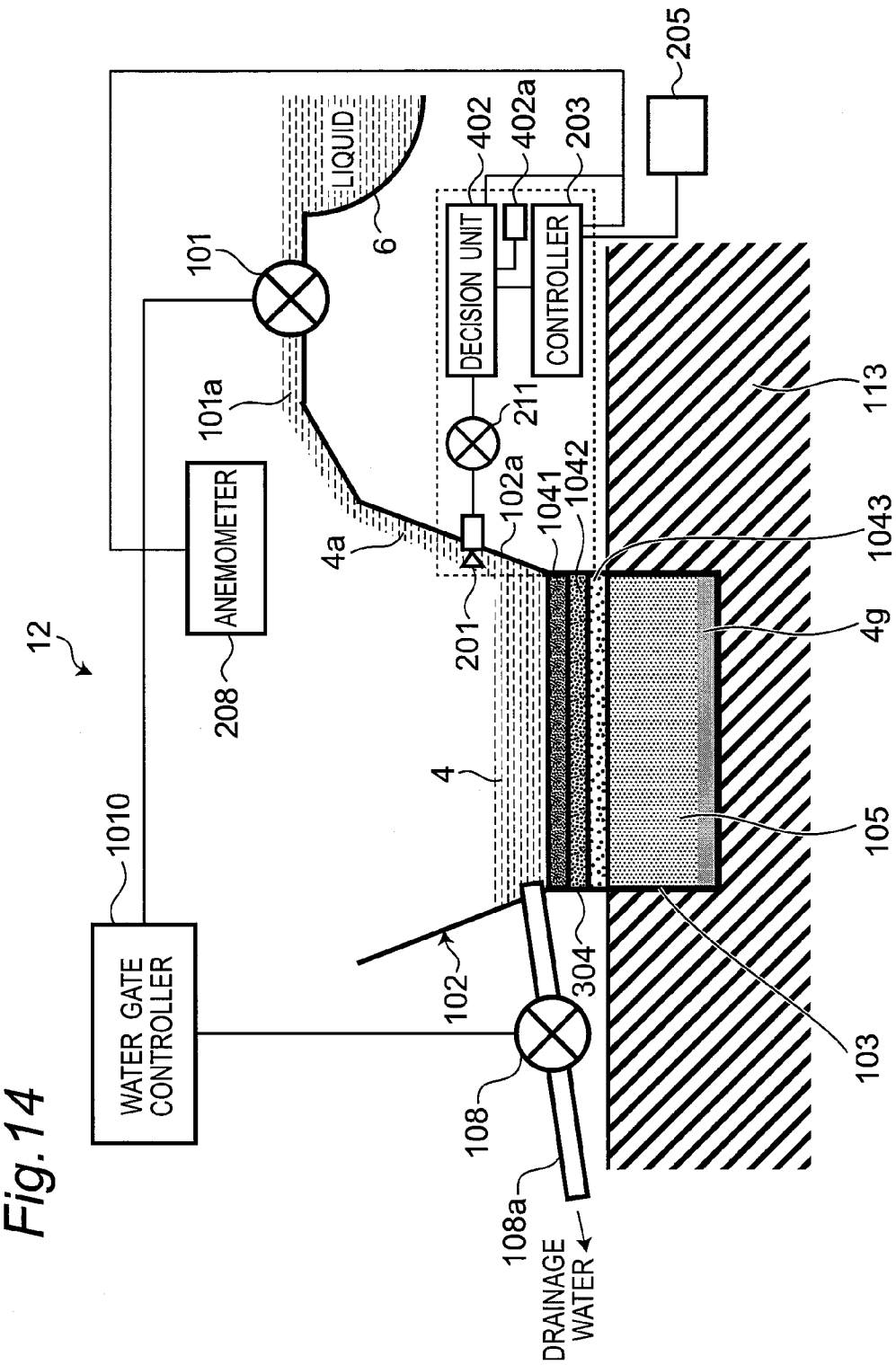
FIG. 14 is a view of a desalination system according to a third embodiment.

FIG. 14 shows a desalination system 12 according to the third embodiment. The desalination system 12 according to the third embodiment is different from the desalination systems 2 and 3 according to the first and second embodiments by including a decision unit 402. Other configurations in the desalination system 12 can be similar to those of the desalination systems 2, 2B, and 3 according to the first embodiment inclusive of its modification example and the second embodiment.

While the liquid 4a is introduced to the water tank 102, the situation repetitively transitions from the states shown in FIG. 4B to FIG. 4D to reach the state shown in FIG. 4E. Illustrated in these figures is that the flow of the liquid, which is dependent on the amount of the introduced liquid 4a, the thickness of the liquid layer 4, or the like, varies the amount of the water-repellent particles 1040 in the liquid layer 4. Such variation brings into a possible state where the water-repellent particles 1040 are not dispersed uniformly in the liquid layer 4 and the particle measuring unit 201 temporarily measures a large amount of the water-repellent particles 1040 due to the flow of the liquid 4a.

The decision unit 402 decides whether or not the amount of the water-repellent particles is equal to or more than a predetermined value, in view of the variation in measurement results of the particle measuring unit 201.

<Decision Unit 402>

The flow of the liquid 4a can temporarily float a large amount of the water-repellent particles 1040. This occurs immediately after introduction of the liquid 4a, for example. The particle measuring unit 201 is capable of measuring only a part of the water-repellent particles 1040. When the decision unit 402 makes the decision in accordance with measurement of a large amount of the temporarily floating water-repellent particles 1040, the amount of the floating water-repellent particles 1040 may be overestimated as compared with the amount of the actually floating water-repellent particles 1040. The depth of the concave portion 400 at the second particle layer 1042 may be smaller than the estimation in this case, with no necessity for output of an alert or the like. The decision unit 402 thus makes the decision in view of a variation amount of the measured amount of the water-repellent particles.

(First Decision)

The decision unit 402 decides whether or not the amount of the water-repellent particles in the predetermined color out of the amounts of the water-repellent particles measured by the particle measuring unit 201 is equal to or more than a reference value (first reference value). The measured amount of the water-repellent particles is also called "first measurement information". The decision unit 402 has a storage unit 402a for storing information acquired by the particle measuring unit 201. The storage unit 402a stores information acquired before the acquisition of the first measurement information.

(Second Decision)

The decision unit 402 obtains a variation amount of the water-repellent particles between the first measurement information and the measurement information stored in the storage unit 402a. The measurement information stored in the storage unit 402a can be an amount of the water-repellent particles measured immediately before, or an average value of the stored amounts of the water-repellent particles.

(Third Decision)

When the decision unit 402 decides that the variation amount of the water-repellent particles is equal to or more than a second reference value, the decision unit 402 further decides whether or not a variation amount between the first measurement information and second measurement information received after the first measurement information is less than a third reference value. The variation amount can be an absolute value of the variation amount or a variation rate. The second measurement information can be measurement information acquired at a single time point or can be an average value of measurement information pieces acquired at a plurality of time points.

When the decision unit 402 decides that the variation amount is equal to or more than the third reference value, the decision is assumed to be made in accordance with the measurement of a large amount of the temporarily floating water-repellent particles 1040. In this case, the decision unit 402 can optionally decide again whether or not an average of the amounts of the water-repellent particles measured by the particle measuring unit 201 is equal to or more than the reference value.

The floating water-repellent particles can be temporarily large in amount immediately after the start of introduction of the liquid to the water tank 102, for example. The decision unit 402 can acquire from the water gate controller 1010 information from the start of introduction of the liquid to the water tank 102 until a certain period elapses. The decision unit 402 makes the first to third decisions only when acquiring the information from the water gate controller 1010.

In another example, the floating water-repellent particles can be temporarily large in amount when wind flowing outside the water tank 102 is equal to or more than a wind force deciding predetermined value (a wind force deciding threshold). When the water tank 102 is provided with an anemometer 208 (see FIG. 14) and a wind force measured by the anemometer 208 is equal to or more than the wind force deciding predetermined value, the anemometer 208 can transmit the information to the decision unit 402. The decision unit 402 makes the first to third decisions only when acquiring the information from the anemometer 208. If the wind force measured by the anemometer 208 is less than the wind force deciding predetermined value, the decision unit 402 makes the decision illustrated in FIG. 9.

The decision unit 402 can alternatively receive the measured wind force from the anemometer 208 and compare the value of the received wind force with the wind force deciding predetermined value that is held preliminarily. If the measured wind force is equal to or more than the wind force deciding predetermined value, the decision unit 402 makes the first to third decisions. If the wind force measured by the anemometer 208 is less than the wind force deciding predetermined value, the decision unit 402 makes the decision illustrated in FIG. 9.

<Processing by Measurement System for Water-Repellent Particle Layer>

Figure 15:
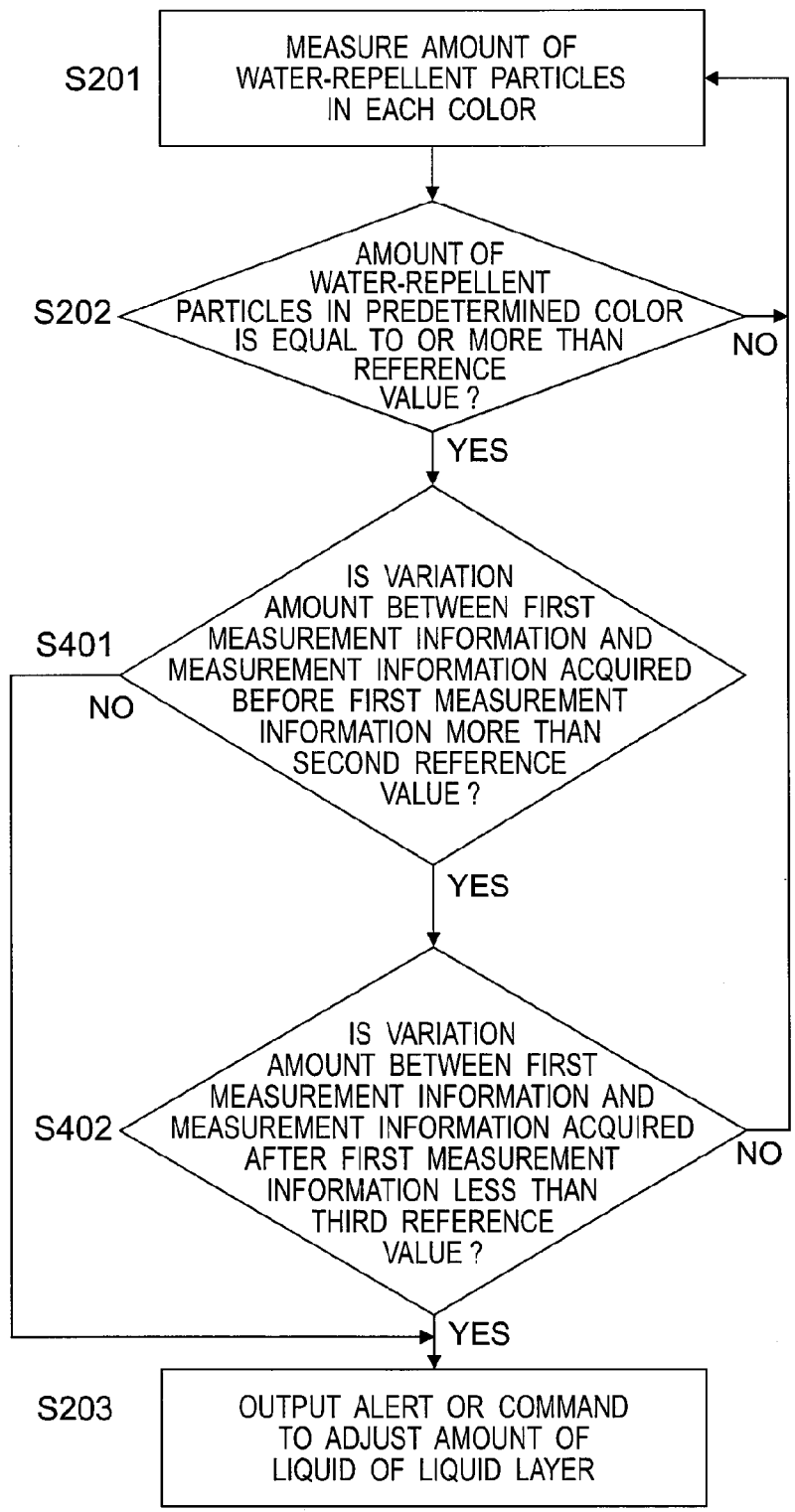
FIG. 15 is a flowchart of processing by a measurement system for a water-repellent particle layer in the desalination system according to the third embodiment.

FIG. 15 is a flowchart of processing by a measurement system for the water-repellent particle layer 304. The steps S201, S202, and S203 are same as those in the flowchart of FIG. 9.

<Step S201>

The particle measuring unit 201 measures the amount of the water-repellent particles in each color, which are floating in the liquid layer 4.

<Step S202>

The decision unit 402 decides whether or not the amount of the water-repellent particles in the predetermined color thus measured in step S201 is equal to or more than the first reference value. The amount of the water-repellent particles in the predetermined color thus measured in step S201 is also called "first measurement information". If the decision unit 402 decides that the amount of the water-repellent particles is equal to or more than the first reference value, the flow proceeds to step S203. If the decision unit 402 decides that the amount of the water-repellent particles is less than the first reference value, the flow returns to step S201. Accordingly, the following processing is not performed unless a predetermined or more amount of the water-repellent particles in the predetermined color are floating in the liquid layer 4. In reverse expression, the following processing is performed only when the predetermined or more amount of the water-repellent particles in the predetermined color are floating in the liquid layer 4.

<Step S401>

Figure 16:
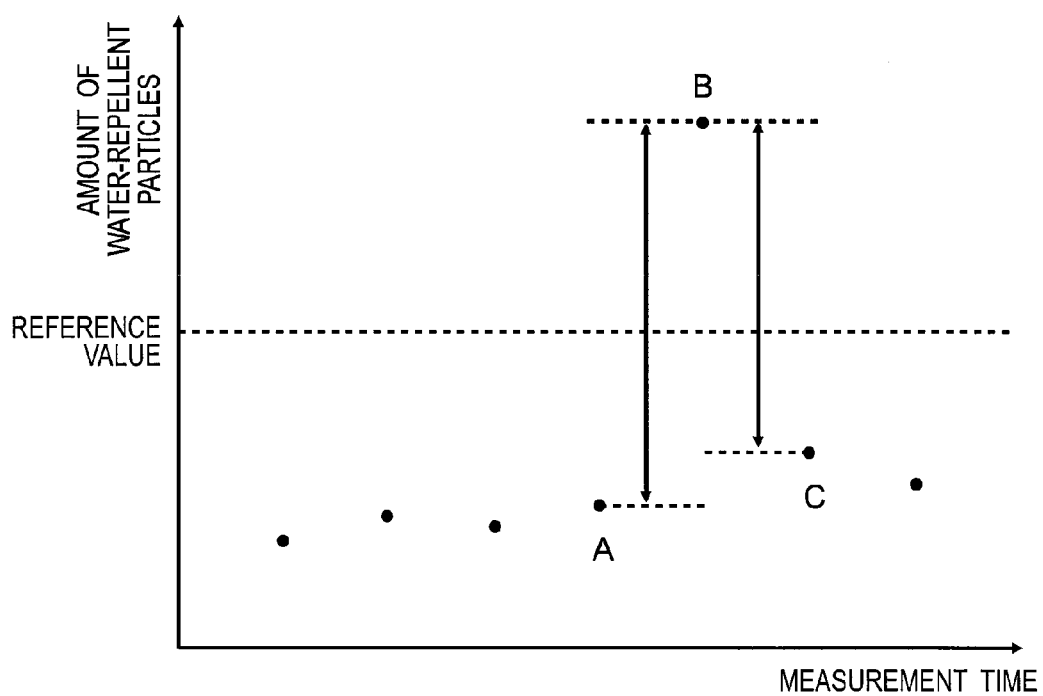
FIG. 16 is a graph schematically indicating a variation amount of water-repellent particles in the desalination system according to the third embodiment.

The decision unit 402 decides whether or not a variation amount between the first measurement information and the measurement information stored in the storage unit 402a and acquired before the first measurement information is more than the second reference value. If the decision unit 402 decides that the variation amount is more than the second reference value, the flow proceeds to step S402. If the decision unit 402 decides that the variation amount is equal to or less than the second reference value, the decision unit 402 can decide that a large amount of the water-repellent particles 1040 are not measured temporarily. The flow thus normally proceeds to step S203. FIG. 16 is a graph schematically indicating the variation amount of the water-repellent particles. In FIG. 16, the ordinate axis indicates the amount of the water-repellent particles and the transverse axis indicates measurement time. The decision unit 402 decides in step S401 whether or not a variation amount between the value exceeding the reference value at measurement time B (the first measurement information) and the information at measurement time A is more than the second reference value.

<Step S402>

The decision unit 402 decides whether or not a variation amount between the first measurement information and measurement information acquired after the first measurement information is less than the third reference value. If the decision unit 402 decides that the variation amount is equal to or more than the third reference value, the first measurement information is assumed to be acquired by measuring a large amount of the temporarily floating water-repellent particles 1040. The flow thus returns to step S201 to restart measurement.

If the decision unit 402 decides that the variation amount is less than the third reference value, the decision unit 402 can decide that a large amount of the water-repellent particles 1040 are not measured temporarily. The flow thus normally proceeds to step S203.

The decision unit 402 decides in step S402 whether or not a variation amount between the value at the measurement time B (the first measurement information) and the value at measurement time C (the second measurement information) shown in FIG. 16 is less than the third reference value.

<Step S203>

When the decision unit 402 decides that the amount of the water-repellent particles in the predetermined color is equal to or more than the first reference value, the controller 203 outputs an alert or a command (signal) to adjust the amount of the liquid of the liquid layer 4.

The controller 203 can preliminarily hold a command (signal) for the case where the amount is equal to or more than the first reference value. The controller 203 can alternatively acquire a command (signal) stored in the reference value hold unit 206.

According to the third embodiment, even when the flow of the liquid 4a temporarily floats a large amount of the water-repellent particles 1040 and the decision unit decides that the measured amount of the second water-repellent particles is equal to or more than the predetermined value (the first reference value), it is possible to recognize that the amount of the second water-repellent particles is merely temporarily equal to or more than the predetermined value (the first reference value) by comparing the measurement information acquired before measurement of the amount of the second water-repellent particles and the subsequent measurement information acquired after the measurement of the amount of the second water-repellent particles. It is thus possible to prevent erroneous estimation that a larger amount of water-repellent particles 1040 are floating than the actually floating water-repellent particles 1040 and output of an erroneous alert or the like, and perform more efficient desalination processing.

Other Embodiments

Figure 17:
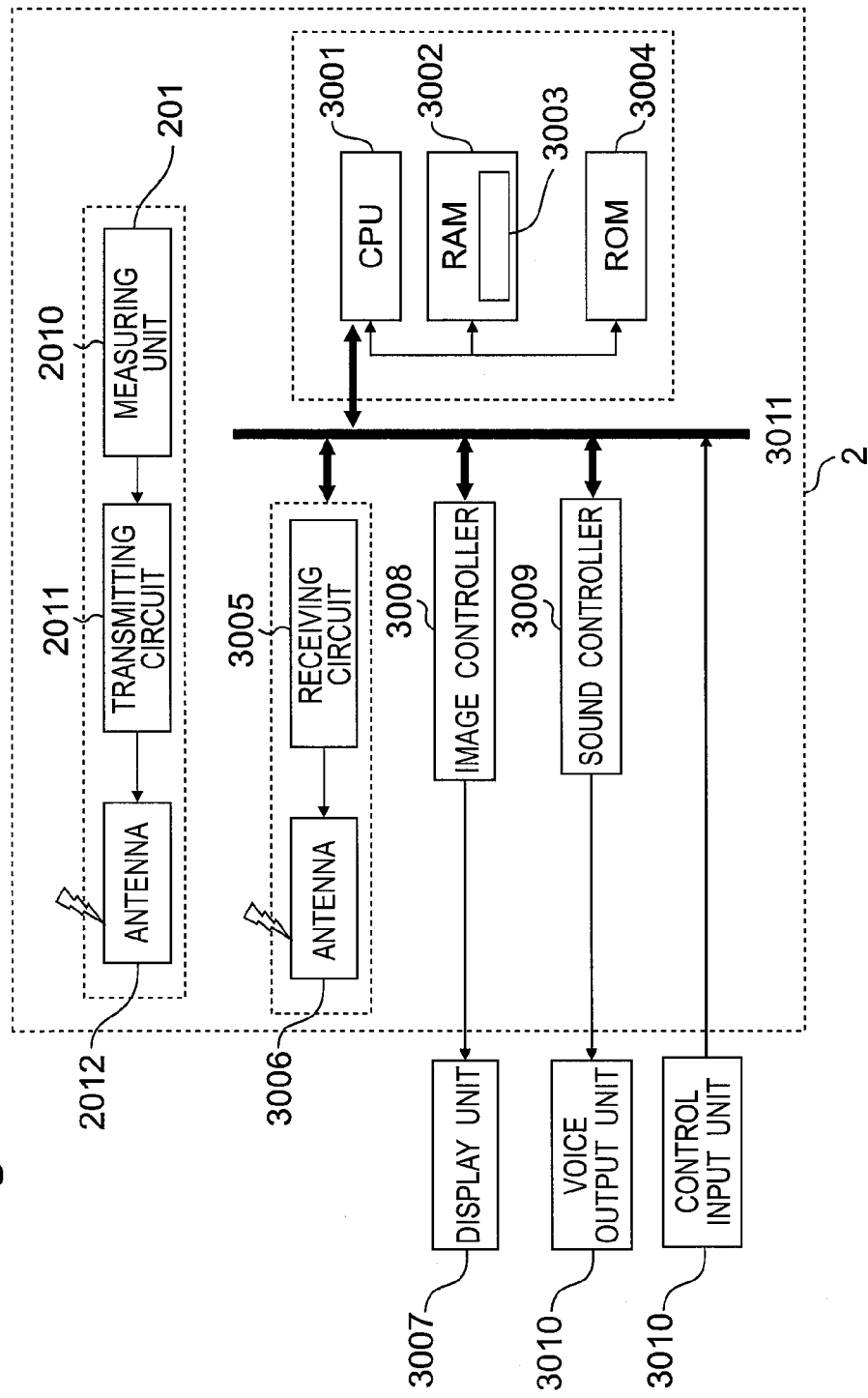
FIG. 17 is a view exemplifying a hardware configuration of the desalination system according to the first embodiment.

FIG. 17 exemplifies a hardware configuration of the desalination system 2. The particle measuring unit 201 includes a measuring unit 2010 provided with the camera 201a, the calculator 201c, and the storage unit 201b, a transmitting circuit 2011, and an antenna 2012. The transmitting circuit 3011 transmits a measurement result of the measuring unit 2010 from the antenna 2012.

The decision unit 202 includes an antenna 3006, a receiving circuit 3005, and a CPU 3001. The antenna 3006 receives the measurement result transmitted from the antenna 2012, and the receiving circuit 3005 receives the measurement result. The receiving circuit 3005 and the CPU 3001 are connected to each other by a bus 3011 so as to transmit and receive data therebetween. The information acquired by the particle measuring unit 201 is transmitted from the receiving circuit 3005 to the CPU 3001 by way of the bus 3011.

The controller 203 includes the CPU 3001 and either one of an image controller 3008 and a voice controller 3009. The CPU 3001 configuring the decision unit 202 and the controller 203 executes a program 3003 stored in a RAM 3002. The program 3003 includes a processing procedure illustrated in the flowchart of FIG. 9 or the like. The program 3003 can be alternatively stored in a ROM 3004.

In accordance with the processing by the CPU 3001 configuring the controller 303, the image controller 3008 controls information displayed at a display unit 3007, or the voice controller 3009 controls voice information outputted from a voice output unit 3010.

The CPU 3001 configuring the controller 303 can control processing of the water gate controller 1010 or the repair unit 204 in accordance with the information inputted through a control input unit 3010.

Though the present disclosure has been described above based on the above first to third embodiments and modification examples, the present disclosure should not be limited to the above-described first to third embodiments and modification examples. For example, the present disclosure also includes the following cases.

Part or entirety of each of the above-described controllers (control devices) of the desalination system is actually a computer system that includes, for example, a microprocessor, ROM, RAM, hard disk unit, display unit, keyboard, mouse, and the like. A computer program is stored on the RAM or the hard disk unit. Functions of each of the controllers (control devices) can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the desalination system according to each of the above-mentioned embodiments is a following program. That is, such a program for the desalination system is a program for the desalination system, causing a computer to function as:

a decision unit that decides whether or not the amount of the measured second water-repellent particles is equal to or more than a predetermined value; and a controller that outputs, when the decision unit decides that the amount of the second water-repellent particles is equal to or more than the predetermined value, an alert signal, a signal to stop introduction of liquid to the water tank, or a signal to decrease speed of introducing liquid to the water tank in comparison to speed of introducing liquid to the water tank prior to the decision by the decision unit.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification example(s) of the aforementioned various embodiments and modification examples, the effects possessed by the embodiment(s) or modification example(s) can be produced.

INDUSTRIAL APPLICABILITY

The present disclosure provides the measurement system included in the desalination system, the desalination system, and the desalination method. The desalination system for desalinating liquid measures the amount of the water-repellent particles floating from the water-repellent particle layer of the desalination apparatus into the liquid, so as to previously prevent breakage of the water-repellent particle layer and efficiently and reliably perform automatic desalination processing.

The entire disclosure of Japanese Patent Application No. 2012-284788 filed on Dec. 27, 2012, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A measurement system included in a desalination system comprising:
   a water tank;
   a water-repellent particle layer provided in the water tank and composed of water-repellent particles; and
   a devolatilizing layer provided below the water-repellent particle layer,
   wherein liquid is introduced to the water tank,
   the introduced liquid is heated to be evaporated into water vapor, and
   the water vapor passes through the water-repellent particle layer and is liquefied at the devolatilizing layer, and fresh water is obtained from the liquid,
   the water-repellent particle layer comprises a first particle layer composed of first water-repellent particles and a second particle layer provided below the first particle layer and composed of second water-repellent particles that are discriminable from the first water-repellent particles,
   the measurement system comprising:
   a particle measuring unit that measures an amount of the second water-repellent particles contained in the liquid;
   a decision unit that decides whether or not the amount of the second water-repellent particles measured by the particle measuring unit is equal to or more than a predetermined value; and
   a controller that outputs, when the decision unit decides that the amount of the second water-repellent particles is equal to or more than the predetermined value, an alert signal, a signal to stop introduction of liquid to the water tank, or a signal to decrease speed of introducing liquid to the water tank in comparison to speed of introducing liquid to the water tank prior to decision by the decision unit.

2. The measurement system according to claim 1, wherein the first water-repellent particles of the first particle layer and the second water-repellent particles of the second particle layer are different in color.

3. The measurement system according to claim 2, wherein the particle measuring unit is a camera configured to image a top surface of the liquid layer and an inside near the top surface to measure the amount of the second water-repellent particles contained in the liquid layer.

4. The measurement system according to claim 2, wherein the particle measuring unit is a camera that is provided on a side wall of the water tank and is configured to image an inside of the liquid layer, and the camera is configured to image a side wall opposite to the side wall provided with the camera through the inside of the liquid layer to measure the amount of the second water-repellent particles contained in the liquid layer.

5. The measurement system according to claim 2, wherein the particle measuring unit is configured to transmit, to the decision unit, the amount of the second water-repellent particles associated with measurement time.

6. The measurement system according to claim 2, wherein
the water-repellent particle layer further comprises a third particle layer provided below the second particle layer and having third water-repellent particles that are discriminable from the first water-repellent particles and the second water-repellent particles,
the particle measuring unit is configured to measure the amount of the second water-repellent particles and an amount of the third water-repellent particles contained in the liquid layer,
the decision unit is configured to decide whether or not the measured amount of the second water-repellent particles is equal to or more than a predetermined value, and decide whether or not the measured amount of the third water-repellent particles is equal to or more than a predetermined value, and
the controller is configured to output, when the decision unit decides that the amount of the second water-repellent particles is equal to or more than the predetermined value, the alert signal or the signal to decrease the speed of introducing liquid to the water tank in comparison to the speed of introducing liquid to the water tank prior to the decision by the decision unit, and stop, when the decision unit decides that the amount of the third water-repellent particles is equal to or more than the predetermined value, introduction of liquid to the water tank.

7. The measurement system according to claim 2, wherein
the decision unit is configured to obtain, when deciding that the measured amount of the second water-repellent particles is equal to or more than a predetermined first reference value, a variation amount of the water-repellent particles between first measurement information as information on the measured amount of the second water-repellent particles and preliminarily held measurement information, further decide, when the obtained variation amount of the water-repellent particles is more than a second reference value, whether or not a variation amount between the first measurement information and second measurement information as information on an amount of the second water-repellent particles measured after the first measurement information is less than a third reference value, and cause the particle measuring unit to measure again when deciding that the variation amount is equal to or more than the third reference value, and
the controller is configured to output, when the decision unit decides that the variation amount is less than the third reference value, the alert signal, the signal to stop introduction of the liquid to the water tank, or the signal to decrease the speed of introducing liquid to the water tank in comparison to the speed of introducing the liquid to the water tank prior to the decision by the decision unit.

8. The measurement system according to claim 2, wherein
the decision unit is configured to,
when wind force measured by an anemometer that is provided to the water tank and is configured to measure wind force is equal to or more than a wind force deciding predetermined value,
obtain, when deciding that the measured amount of the second water-repellent particles is equal to or more than a predetermined first reference value, a variation amount of the second water-repellent particles between first measurement information as information on the measured amount of the second water-repellent particles and preliminarily held measurement information, further decide, when the obtained variation amount of the second water-repellent particles is more than a second reference value, whether or not a variation amount between the first measurement information and second measurement information as information on an amount of the second water-repellent particles measured after the first measurement information is less than a third reference value, and cause the particle measuring unit to measure again when deciding that the variation amount is equal to or more than the third reference value, and
the controller is configured to output, when the decision unit decides that the variation amount is less than the third reference value, the alert signal, the signal to stop introduction of the liquid to the water tank, or the signal to decrease the speed of introducing the liquid to the water tank in comparison to the speed of introducing the liquid to the water tank prior to the decision by the decision unit,
the decision unit is configured to,
when the wind force measured by the anemometer is less than the wind force deciding predetermined value,
decide whether or not the amount of the second water-repellent particles measured by the particle measuring unit is equal to or more than a liquid amount control deciding predetermined value, and
the controller is configured to output, when the decision unit decides that the amount of the second water-repellent particles is equal to or more than the liquid amount control deciding predetermined value, the alert signal, the signal to stop introduction of liquid to the water tank, or the signal to decrease the speed of introducing liquid to the water tank in comparison to the speed of introducing liquid to the water tank prior to the decision by the decision unit.

9. The measurement system according to claim 1, wherein the particle measuring unit is a camera configured to image a top surface of the liquid layer and an inside near the top surface to measure the amount of the second water-repellent particles contained in the liquid layer.

10. The measurement system according to claim 1, wherein the particle measuring unit is a camera that is provided on a side wall of the water tank and is configured to image an inside of the liquid layer, and the camera is configured to image a side wall opposite to the side wall provided with the camera through the inside of the liquid layer to measure the amount of the second water-repellent particles contained in the liquid layer.

11. The measurement system according to claim 1, wherein the particle measuring unit is configured to transmit, to the decision unit, the amount of the second water-repellent particles associated with measurement time.

12. The measurement system according to claim 1, wherein
the water-repellent particle layer further comprises a third particle layer provided below the second particle layer and having third water-repellent particles that are discriminable from the first water-repellent particles and the second water-repellent particles,
the particle measuring unit is configured to measure the amount of the second water-repellent particles and an amount of the third water-repellent particles contained in the liquid layer,
the decision unit is configured to decide whether or not the measured amount of the second water-repellent particles is equal to or more than a predetermined value, and decide whether or not the measured amount of the third water-repellent particles is equal to or more than a predetermined value, and
the controller is configured to output, when the decision unit decides that the amount of the second water-repellent particles is equal to or more than the predetermined value, the alert signal or the signal to decrease the speed of introducing liquid to the water tank in comparison to the speed of introducing liquid to the water tank prior to the decision by the decision unit, and stop, when the decision unit decides that the amount of the third water-repellent particles is equal to or more than the predetermined value, introduction of liquid to the water tank.

13. The measurement system according to claim 1, wherein
the decision unit is configured to obtain, when deciding that the measured amount of the second water-repellent particles is equal to or more than a predetermined first reference value, a variation amount of the water-repellent particles between first measurement information as information on the measured amount of the second water-repellent particles and preliminarily held measurement information, further decide, when the obtained variation amount of the water-repellent particles is more than a second reference value, whether or not a variation amount between the first measurement information and second measurement information as information on an amount of the second water-repellent particles measured after the first measurement information is less than a third reference value, and cause the particle measuring unit to measure again when deciding that the variation amount is equal to or more than the third reference value, and
the controller is configured to output, when the decision unit decides that the variation amount is less than the third reference value, the alert signal, the signal to stop introduction of the liquid to the water tank, or the signal to decrease the speed of introducing liquid to the water tank in comparison to the speed of introducing the liquid to the water tank prior to the decision by the decision unit.

14. The measurement system according to claim 1, wherein
the decision unit is configured to,
when wind force measured by an anemometer that is provided to the water tank and is configured to measure wind force is equal to or more than a wind force deciding predetermined value,
obtain, when deciding that the measured amount of the second water-repellent particles is equal to or more than a predetermined first reference value, a variation amount of the second water-repellent particles between first measurement information as information on the measured amount of the second water-repellent particles and preliminarily held measurement information, further decide, when the obtained variation amount of the second water-repellent particles is more than a second reference value, whether or not a variation amount between the first measurement information and second measurement information as information on an amount of the second water-repellent particles measured after the first measurement information is less than a third reference value, and cause the particle measuring unit to measure again when deciding that the variation amount is equal to or more than the third reference value, and
the controller is configured to output, when the decision unit decides that the variation amount is less than the third reference value, the alert signal, the signal to stop introduction of the liquid to the water tank, or the signal to decrease the speed of introducing the liquid to the water tank in comparison to the speed of introducing the liquid to the water tank prior to the decision by the decision unit,
the decision unit is configured to,
when the wind force measured by the anemometer is less than the wind force deciding predetermined value,
decide whether or not the amount of the second water-repellent particles measured by the particle measuring unit is equal to or more than a liquid amount control deciding predetermined value, and
the controller is configured to output, when the decision unit decides that the amount of the second water-repellent particles is equal to or more than the liquid amount control deciding predetermined value, the alert signal, the signal to stop introduction of liquid to the water tank, or the signal to decrease the speed of introducing liquid to the water tank in comparison to the speed of introducing liquid to the water tank prior to the decision by the decision unit.

15. A desalination system comprising:
a water tank that receives introduced liquid;
a first particle layer provided in the water tank and having first water-repellent particles;
a second particle layer provided below the first particle layer and having second water-repellent particles that are discriminable from the first water-repellent particles;
a devolatilizing layer provided below the second particle layer;
a particle measuring unit that measures an amount of the second water-repellent particles in the liquid;
a decision unit that decides whether or not the amount of the second water-repellent particles measured by the particle measuring unit is equal to or more than a predetermined value; and a controller that outputs, when the decision unit decides that the amount of the second water-repellent particles is equal to or more than the predetermined value, an alert signal, a signal to stop introduction of liquid to the water tank, or a signal to decrease speed of introducing liquid to the water tank in comparison to speed of introducing liquid to the water tank prior to the decision by the decision unit.

16. A desalination method for obtaining fresh water from liquid using a desalination apparatus comprising:
   a water tank for containing liquid and including a lid covering an opening thereof to decrease an amount of water vapor released from the water tank;
   a first particle layer provided in the water tank and composed of first water-repellent particles;
   a second particle layer provided below the first particle layer and composed of second water-repellent particles that are discriminable from the first water-repellent particles; and
   a devolatilizing layer provided below the second particle layer;

the desalination method comprising:
   introducing liquid to the water tank;
   heating the introduced liquid to be evaporated into water vapor;
   passing the water vapor through the first particle layer and the second particle layer to be liquefied at the devolatilizing layer and obtaining fresh water from the liquid;
   measuring, by a particle measuring unit, an amount of the second water-repellent particles in the liquid;
   deciding, by a decision unit, whether or not the measured amount of the second water-repellent particles is equal to or more than a predetermined value; and
   outputting by a controller, when the decision unit decides that the amount of the second water-repellent particles is equal to or more than the predetermined value, an alert signal, a signal to stop introduction of liquid to the water tank, or a signal to decrease speed of introducing liquid to the water tank in comparison to speed of introducing liquid to the water tank prior to the decision by the decision unit.

* * * * *